(12) United States Patent
Tanaka et al.

(10) Patent No.: US 6,214,990 B1
(45) Date of Patent: Apr. 10, 2001

(54) TRIPHENODIOXAZINE COMPOUND, METHOD FOR PREPARING THE SAME, USE OF THE COMPOUND AS DICHROIC DYE, AND LIQUID CRYSTAL COMPOSITION

(75) Inventors: Toshihiko Tanaka, Inashiki-gun; Toru Ashida, Tsukuba, both of (JP)

(73) Assignees: Sumitomo Chemical Company, Limited, Osaka; Japan as represented by Secretary of Agency of Industrial Science and Technology; New Energy and Industrial Technology Development Organization, both of Tokyo, all of (JP)

( * ) Notice: Subject to any disclaimer, the term of this patent is extended or adjusted under 35 U.S.C. 154(b) by 0 days.

(21) Appl. No.: 09/321,612

(22) Filed: May 28, 1999

(30) Foreign Application Priority Data

May 29, 1998 (JP) .................................................. 10-149708

(51) Int. Cl.[7] .................................................. C07D 265/36
(52) U.S. Cl. ............................................. 544/105; 544/99
(58) Field of Search ....................................... 544/99, 105

(56) References Cited

FOREIGN PATENT DOCUMENTS 52-140683    11/1977   (JP) .

OTHER PUBLICATIONS

Ivashchenko, Alexander; *Dichroic Dyes for Liquid Crystal Displays;* pp. 165–337; Jan. 16, 1997.

*Primary Examiner*—Richard L. Raymond
*Assistant Examiner*—Sudhaker B. Patel

(74) *Attorney, Agent, or Firm*—Birch, Stewart, Kolasch & Birch

(57) ABSTRACT

A novel triphenodioxazine compound represented by the formula (1), a process for preparing the same, use of the compound as a dichroic dye, and liquid crystal composition containing the compound are disclosed. The compound is useful as a dichroic dye having a narrow light absorption band and a high dichroic ratio.

(1)

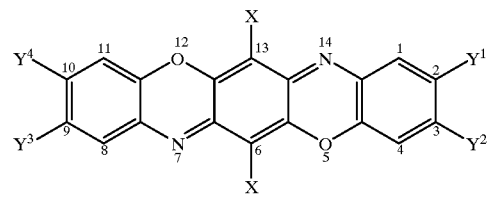

(In the formula, each of $Y^1$ to $Y^4$ stands for a group represented by the formula (2) or (3); h is an integer of 1 to 2; A stands for phenylene or the like; E stands for phenylene or the like; G stands for H, F, or the like; i is an integer of 1 to 2; j is an integer of 0 to 2, each of J and M stands for phenylene or the like; and Q stands for H, F or the like.)

(2)

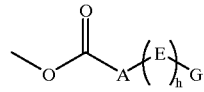

(3)

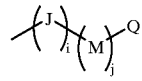

10 Claims, 1 Drawing Sheet

US 6,214,990 B1

TRIPHENODIOXAZINE COMPOUND, METHOD FOR PREPARING THE SAME, USE OF THE COMPOUND AS DICHROIC DYE, AND LIQUID CRYSTAL COMPOSITION

FIELD OF ART

The present invention relates to a novel triphenodioxazine compound that can be used as a dichroic dye useful in the art of liquid crystal display elements, a method for preparing the compound, use of the compound as a dichroic dye, and a liquid crystal composition.

BACKGROUND ART

Compositions containing a liquid-crystalline material and a small amount of a dichroic dye are used for production of liquid crystal display elements of a guest-host type (abbreviated as GH hereinbelow). The GH type element is an important type of a liquid crystal display element, and has been attracting attention particularly as means for improving the efficiency of light utilization in color liquid crystal display elements. A variety of GH liquid crystal display elements have been drawing interests, such as those consisting of a laminate of Heilmeier type GH cells, those consisting of DGH (double layer GH) cells, and those consisting of two or three laminated layers of PCGH (cholesteric-nematic phase change type GH) cells. Recently, reflection type liquid crystal display elements are of particular interest in view of energy conservation or securance of battery life in portable devices. The reflection type liquid crystal display elements lack auxiliary light sources such as back lights, so that use of such GH liquid crystal display elements in the reflection type elements is believed to be advantageous due to their high efficiency of light utilization.

As dichroic dyes for the GH liquid crystal displays, excellent materials with high dichroic ratios have been developed, such as azo dyes, anthraquinone dyes, and quinophthalone dyes. Such materials exhibit high dichroic ratios in many liquid-crystalline materials (Alexander V. Ivashchenko, *Dichroic Dyes for Liquid Crystal Displays*, p165–337, (CRC Press), 1994).

In general, the absorption spectra of dichroic dyes have considerable influence on colored display of GH liquid crystal displays. Thus, in order to broaden the range of the displayable color tones and to ensure color rendering properties, it is necessary to control each of the primaries independently and to combine dyes which overlap little in absorbable wavelength.

The overlap of absorbable wavelengths prevents the independent control of the primaries to narrow the range of the displayable colors, and accompanies additional light absorption to lower the efficiency of light utilization. For avoiding the overlap of absorbable wavelengths, selection of the peak absorption wavelength for each color is important. However, mere selection of the peak absorption wavelength still allows some overlap of absorbable wavelengths since absorption spectra of dyes are generally broad. Thus, it is particularly desired for dichroic dyes to have as narrow light absorption bands as possible in order to reduce the overlap.

Triphenodioxazine was originally developed as a kind of pigments, and it is now generally known to have a narrow light absorption band and to exhibit vivid color tones.

However, the dichroic ratios of conventional dichroic dyes having a triphenodioxazine skeleton are relatively low in liquid crystal, i.e. about 6 to 7 at the best, compared to those of azo dyes and anthraquinone dyes (Alexander V. Ivashchenko, *Dichroic Dyes for Liquid Crystal Displays*, p173, (CRC Press), 1994). Consequently, development of triphenodioxazine dyes with higher dichroic ratios is desired.

DISCLOSURE OF THE INVENTION

It is an object of the present invention to provide a novel triphenodioxazine compound having a high dichroic ratio and a narrow light absorption band, a method for preparing such a compound, use of such a compound as a dichroic dye, and a liquid crystal composition.

The present inventors have made intensive studies for achieving the above object to find out that a novel compound having a triphenodioxazine skeleton with particular substituents incorporated thereto has a high dichroic ratio in liquid crystal, thereby completing the present invention.

According to the present invention, there is provided a triphenodioxazine compound represented by the formula (1)

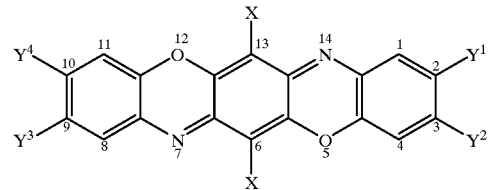

(1)

wherein each of $Y^1$ to $Y^4$ stands for a group represented by the formula (2) or (3) with at least one of $Y^1$ to $Y^4$ being a group represented by the formula (2); X stands for a hydrogen atom, a halogen atom, a cyano group, an alkyl group, an aryl group, an alkoxy group, an acylamino group, or a carboxylate group:

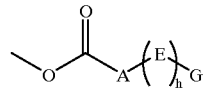

(2)

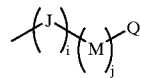

(3)

wherein h is an integer of 1 to 2, i is an integer of 1 to 2, and j is an integer of 0 to 2; A stands for a group selected from group (I) consisting of:

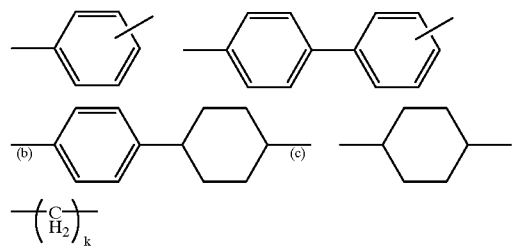

(I)

wherein k is an integer of 1 to 6; one or more of hydrogen atoms in a phenylene group may be substituted by an alkyl group having 1 to 12 carbon atoms, an alkoxy group having 1 to 12 carbon atoms, a perfluoroalkyl group having 1 to 6 carbon atoms, or a halogen atom; end (a) binds to E and end (b) binds to the ester group in the formula (2);

each of E, J, and M stands for a group selected from group (II) consisting of:

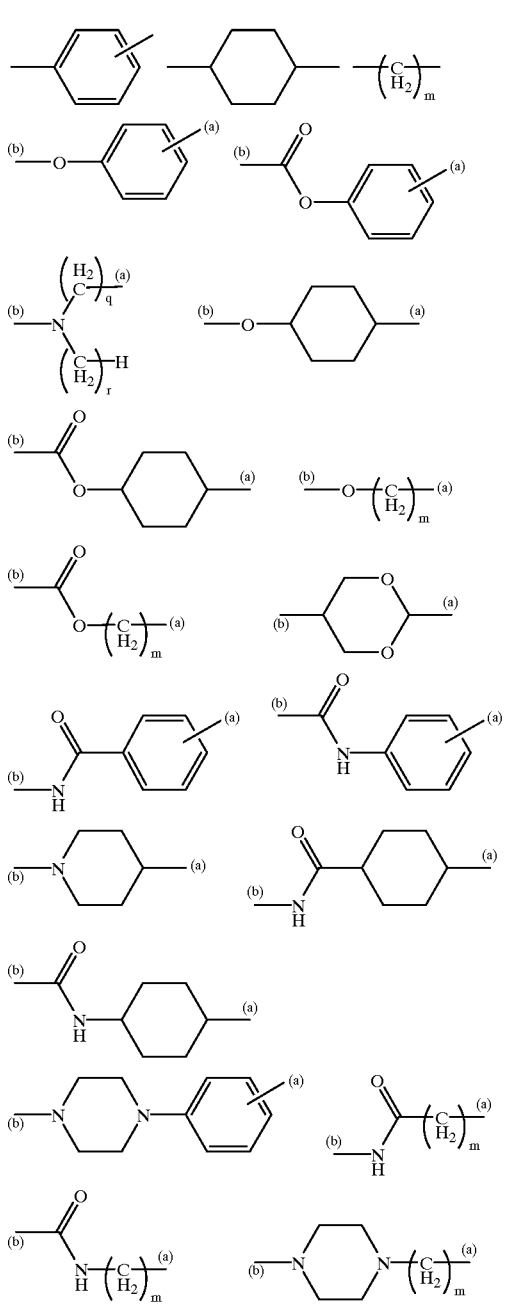

wherein m is an integer of 1 to 12, and each of q and r is an integer of 1 to 8; one or more of hydrogen atoms in a phenylene group may be substituted by an alkyl group having 1 to 6 carbon atoms, an alkoxy group having 1 to 6 carbon atoms, a perfluoroalkyl group having 1 to 6 carbon atoms, or a halogen atom; when E in the formula (2) is a group having ends (a) and (b) selected from group (II), end (a) binds to G or E and end (b) binds to A or E; when J in the formula (3) is a group having ends (a) and (b) selected from group (II), end (a) binds to M, J, or Q in the formula (3) and end (b) binds to J or the triphenodioxazine skeleton; when M in the formula (3) is a group having ends (a) and (b) selected from group (II), end (a) binds to M or Q and end (b) binds to M or J;

G and Q each stands for a group selected from group (III) consisting of:

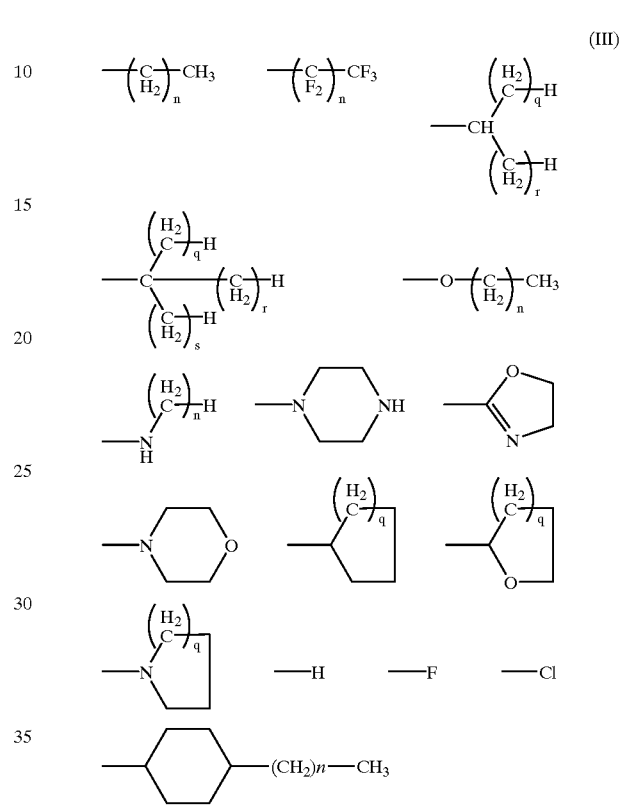

wherein n is an integer of 1 to 12, and each of q, r, and s is an integer of 1 to 8.

According to the present invention, there is also provided use of the triphenodioxazine compound represented by the formula (1) as a dichroic dye.

According to the present invention, there is also provided a method for preparing the triphenodioxazine compound represented by the formula (1) comprising reacting a dianilide compound represented by the formula (4) with an acid chloride represented by the formula (5) to have said dianilide compound undergo ring closure and to esterify at least one hydroxyl or methoxy group of the dianilide compound with said acid chloride:

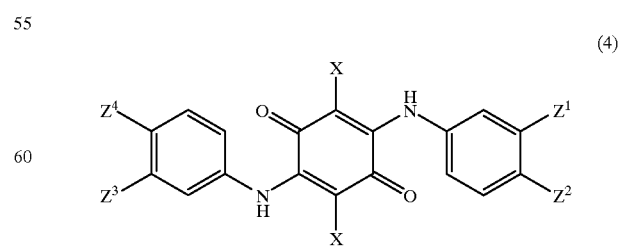

wherein each of $Z^1$ to $Z^4$ stands for a hydroxyl group, a methoxy group, or a group represented by the formula (3)

with at least one of $Z^1$ to $Z^4$ being a hydroxyl or a methoxy group; X is the same as X in the formula (1)

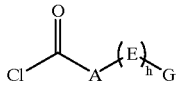
(5)

wherein h is an integer of 1 to 2; each of A, E, and G is the same as A, E, and G in the formula (2), respectively.

According to the present invention, there is also provided a liquid crystal composition comprising at least one triphenodioxazine compound represented by the formula (1) and a liquid-crystalline material.

PREFERRED EMBODIMENTS OF THE INVENTION

Figure 1:
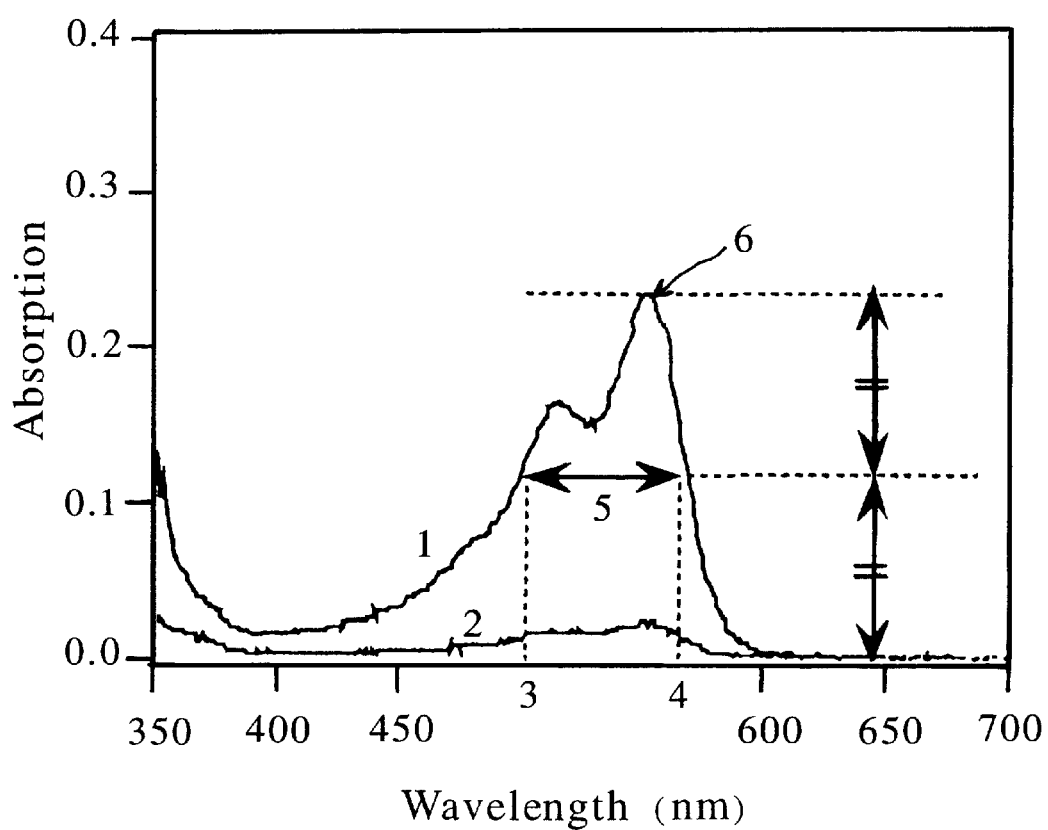
FIG. 1 is a chart illustrating the polarized light absorption spectra of the cell measured in Example 1.

The present invention will now be explained in detail.

The triphenodioxazine compound of the present invention, which is represented by the above formula (1), is dichroic, and thus can be used as a dichroic dye, for example, contained in a liquid crystal composition for a GH liquid crystal display.

In the formula (1), X stands for a hydrogen atom, a halogen atom, a cyano group, an alkyl group, an aryl group, an alkoxy group, an acylamino group, or a carboxylate group. X may suitably be selected from the above depending on the type of the liquid-crystalline material in which the compound is to be dissolved, the required solubility in the liquid-crystalline material, or the like factors. For improving the dichroic ratio of the compound in a common liquid crystal composition, X is preferably a hydrogen atom, a halogen atom, a cyano group, an acylamino group, or a carboxylate group, more preferably a hydrogen atom, a chlorine atom, a bromine atom, or a fluorine atom, and most preferably a hydrogen atom or a chlorine atom.

In the formula (1), each of $Y^1$ to $Y^4$ stands for a group represented by the above formula (2) or (3) with at least one of $Y^1$ to $Y^4$ being an ester group represented by the formula (2). For improving the dichroic ratio of the compound in a liquid crystal composition, preferably at least two of $Y^1$ to $Y^4$ stand for the groups represented by the formula (2).

A in the formula (2) is selected from the groups listed in group (I) mentioned above. In the groups listed in group (I), one or more hydrogen atoms in a phenylene group may be substituted by an alkyl group having 1 to 12 carbon atoms, an alkoxy group having 1 to 12 carbon atoms, a perfluoroalkyl group having 1 to 6 carbon atoms, or a halogen atom. The number of such substituents in A is preferably 0 to 2 for a higher dichroic ratio of the resulting triphenodioxazine compound in a liquid-crystalline material. The substituents are preferably alkyl groups having 1 to 12 carbon atoms, or alkoxy groups having 1 to 12 carbon atoms, and more preferably alkyl groups having 1 to 8 carbon atoms, or alkoxy groups having 1 to 8 carbon atoms, for ready synthesis of the compound.

A may suitably be selected from group (I) depending on the type of the liquid-crystalline material in which the compound is to be dissolved, the required solubility in the liquid-crystalline material, or the like factors. In general, A is preferably a group having a phenylene group, and particularly preferred is a phenylene group, for ready synthesis of the compound.

When A is a group having ends (a) and (b) selected from group (I), end (a) binds to E and end (b) binds to the ester group in the formula (2). In the formula of the group having k in group (I) for A, k is an integer of 1 to 6.

E in the formula (2) is selected from the groups listed in group (II) mentioned above. E may suitably be selected from group (II) depending on the type of the liquid-crystalline material in which the compound is to be dissolved, the required solubility in the liquid-crystalline material, or the like factors. Where E is a group having ends (a) and (b) selected from group (II), when h in the formula (2) is 1, end (a) binds to G and end (b) binds to A; whereas when h is 2, end (a) of one E binds to the other E, of which end (a) in turn binds to G, and end (b) of one E binds to the other E, of which end (b) in turn binds to A. In the formula (2), h is an integer of 1 to 2, but preferably h is 1 for ready synthesis of the compound.

G in the formula (2) is selected from the groups listed in group (III) mentioned above. E may suitably be selected from group (III) depending on the type of the liquid-crystalline material in which the compound is to be dissolved, the required solubility in the liquid-crystalline material, or the like factors. In general, G is preferably an alkyl or alkoxy group for ready synthesis of the compound. In the formulae of groups in group (III) for G, n is an integer of 1 to 12, and each of q, r, and s is an integer of 1 to 8.

In the formula (3), each of J and M is selected from the groups listed in group (II) mentioned above. J and M may suitably be selected from group (II) depending on the type of the liquid-crystalline material in which the compound is to be dissolved, the required solubility in the liquid-crystalline material, or the like factors. In general, J is preferably a group having an oxygen atom at end (b), which is to bind to the triphenodioxazine ring, and more preferably an alkoxy group having an oxygen atom at end (b). M is also preferably a group having an oxygen atom at end (b). When J is a group having ends (a) and (b) selected from group (II), end (a) binds to M, J, or Q depending on the number denoted by i and j in the formula (3), whereas end (b) binds to J or the triphenodioxazine skeleton depending on the number denoted by i and j in the formula (3). When M is a group having ends (a) and (b) selected from group (II), end (a) binds to M or Q depending on the number denoted by j in the formula (3), whereas end (b) binds to M or J depending on the number denoted by j in the formula (3). In the formula (3), i is an integer of 1 to 2, and j is an integer of 0 to 2. For ready synthesis of the compound, the sum of i and j is preferably not more than 3, and more preferably not more than 2.

Q in the formula (3) is selected from the groups listed in group (III) mentioned above. Q may suitably be selected from group (III) depending on the type of the liquid-crystalline material in which the compound is to be dissolved, the required solubility in the liquid-crystalline material, or the like factors. In general, Q is preferably an alkyl or alkoxy group for ready synthesis of the compound. In the formulae of groups in group (III) for Q, n is an integer of 1 to 12, and each of q, r, and s is an integer of 1 to 8.

In the groups listed in group (II) for E, J, and M in the formulae (2) and (3), one or more hydrogen atoms in a phenylene group may be substituted by an alkyl group having 1 to 6 carbon atoms, an alkoxy group having 1 to 6 carbon atoms, a perfluoroalkyl group having 1 to 6 carbon atoms, or a halogen atom.

Examples of the triphenodioxazine compound of the present invention include the compounds represented by the following formulae:

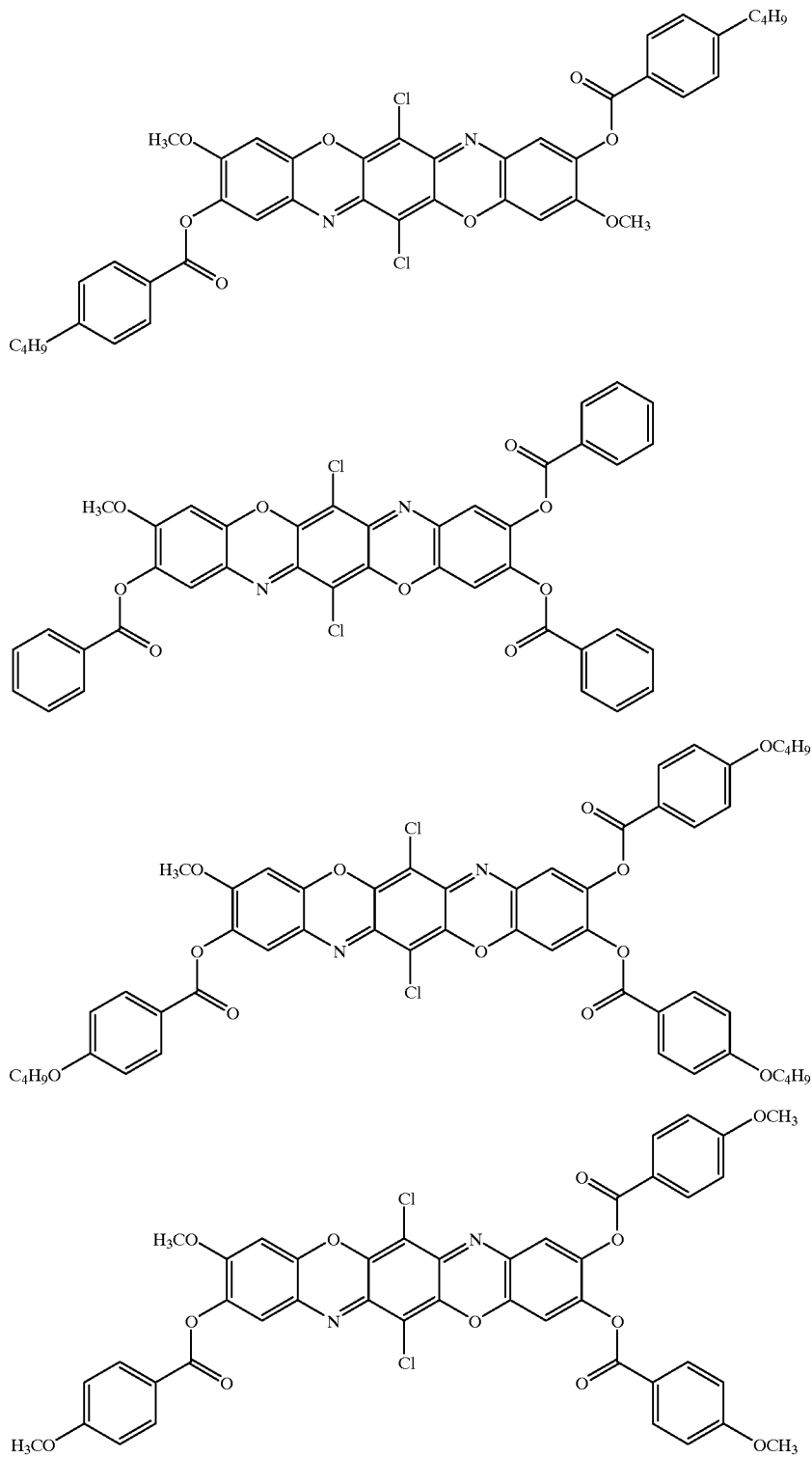

-continued
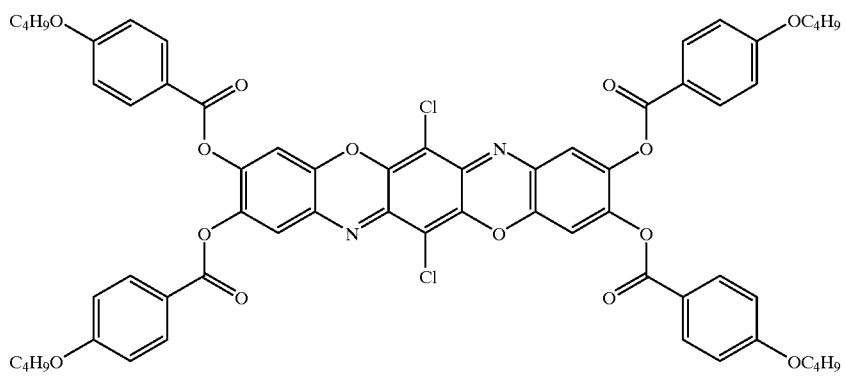
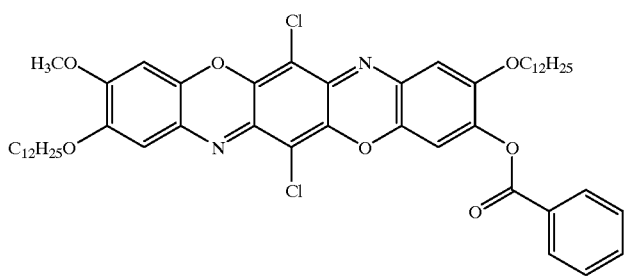
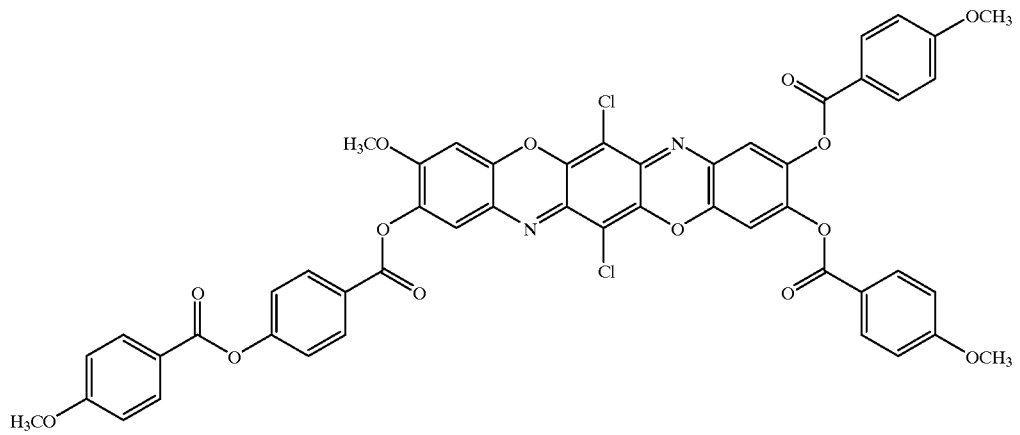
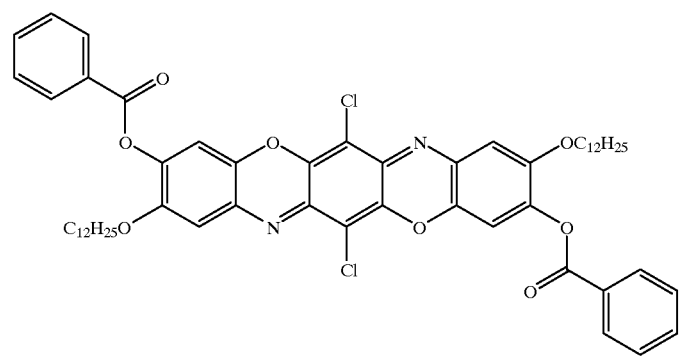

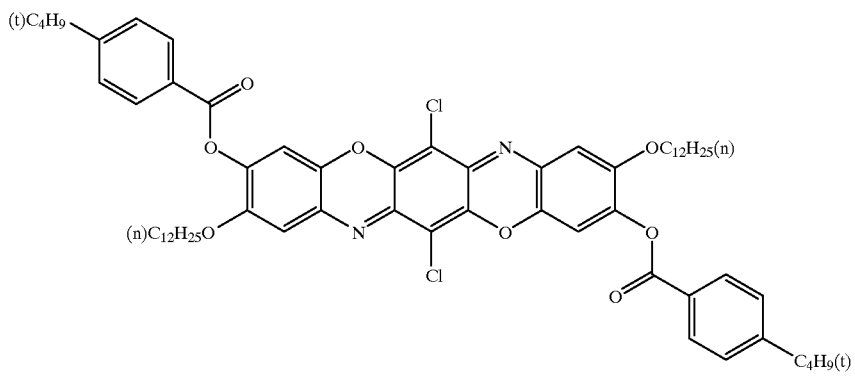
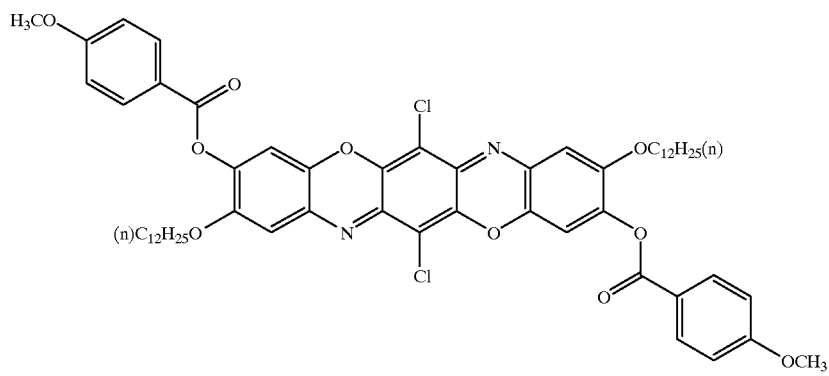
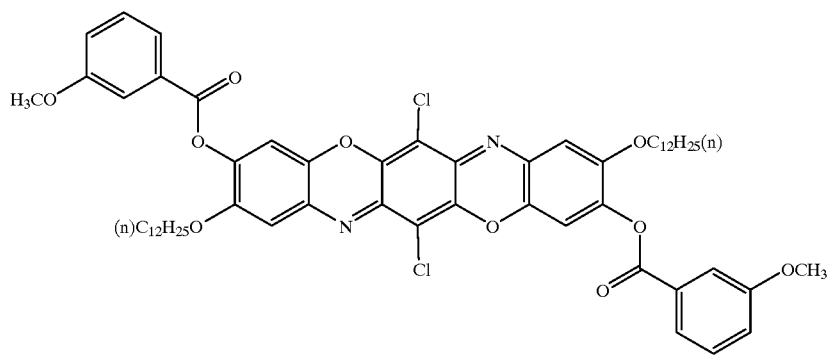
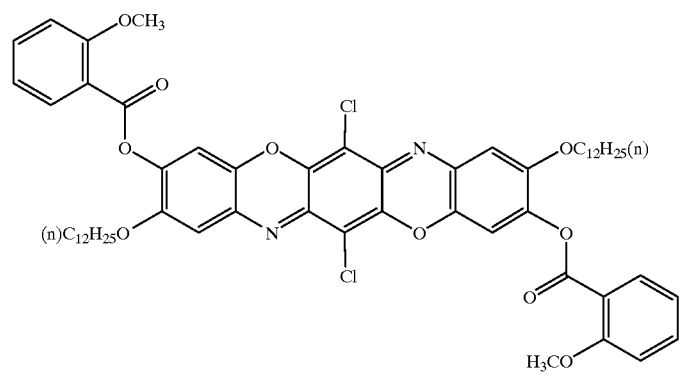

-continued
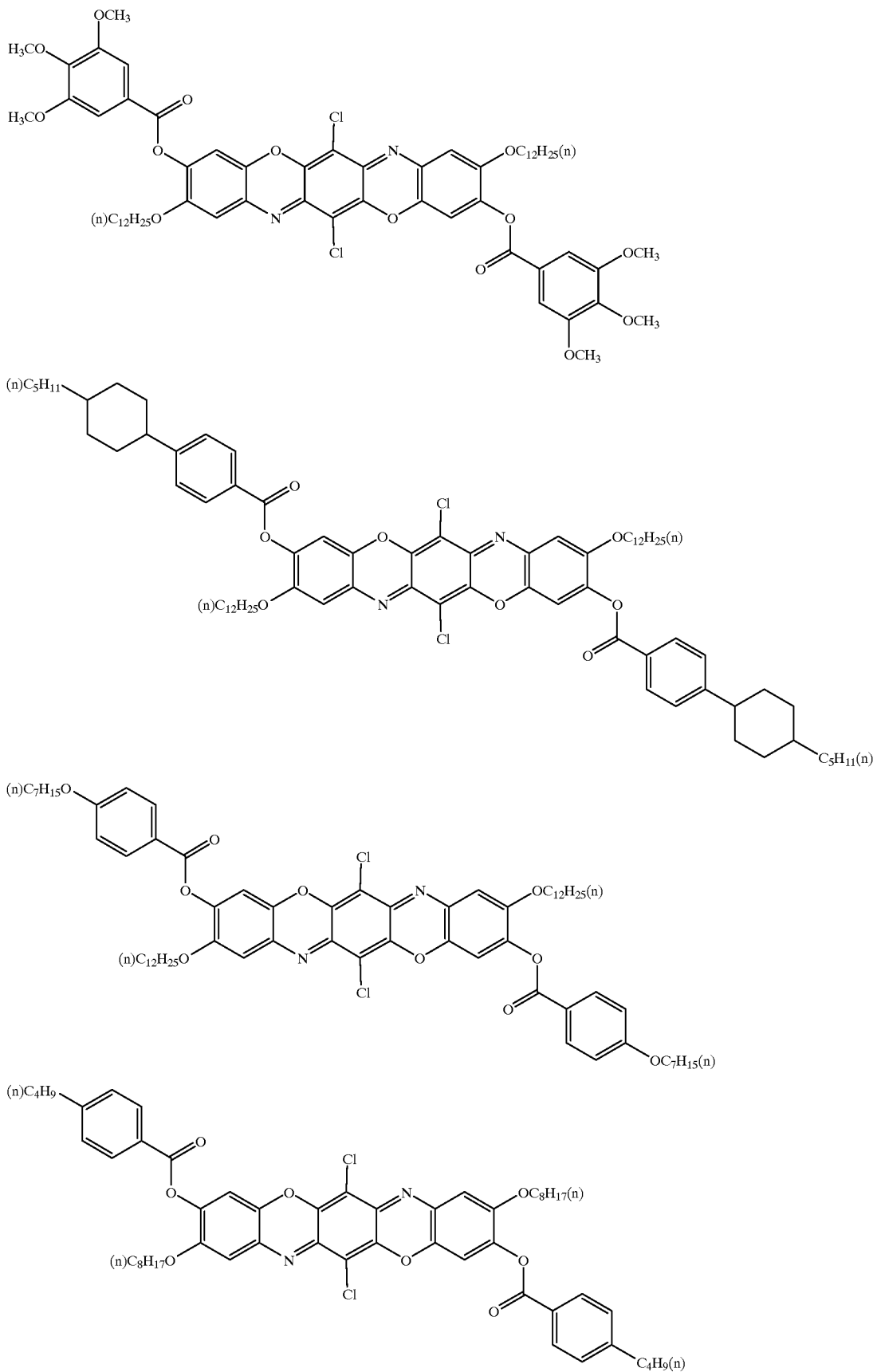

-continued

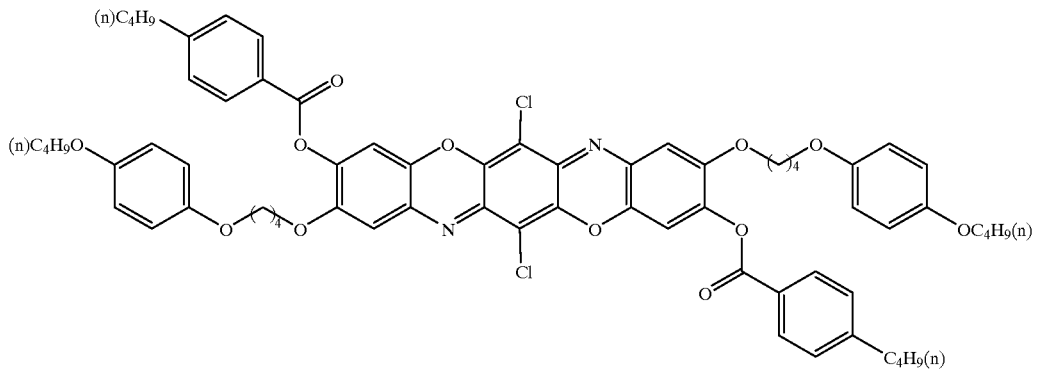

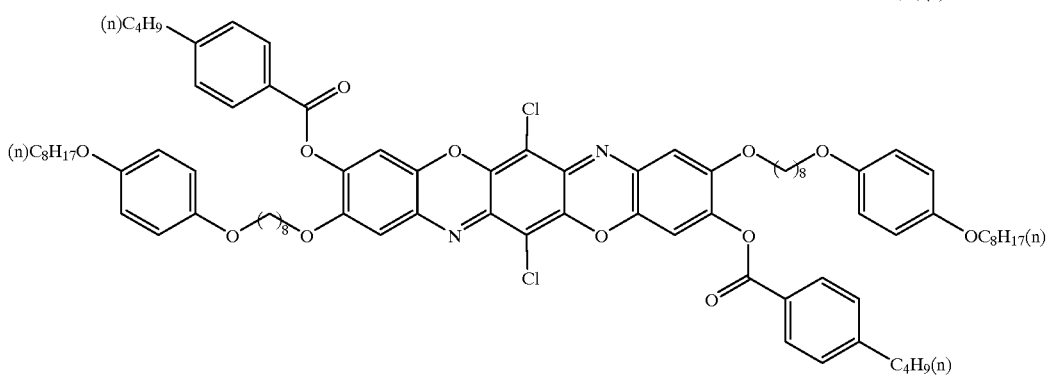

The triphenodioxazine compound of the present invention may be prepared through a combination of publicly known methods, but the method of the present invention to be discussed below will facilitate preparation of the compound.

The method for preparing the triphenodioxazine compound of the present invention includes reacting a dianilide compound represented by the formula (4) with an acid chloride represented by the formula (5) to have the dianilide compound undergo ring closure and to esterify at least one hydroxyl or methoxy group of the dianilide compound with the acid chloride.

In the formula (4) representing the dianilide compound used for the method of the present invention, each of $Z^1$ to $Z^4$ stands for a hydroxyl group, a methoxy group, or a group represented by the formula (3) mentioned above with at least one of $Z^1$ to $Z^4$ being a hydroxyl or a methoxy group.

Examples of the dianilide compound represented by the formula (4) include, but not limited to, the compounds represented by the following formulae:

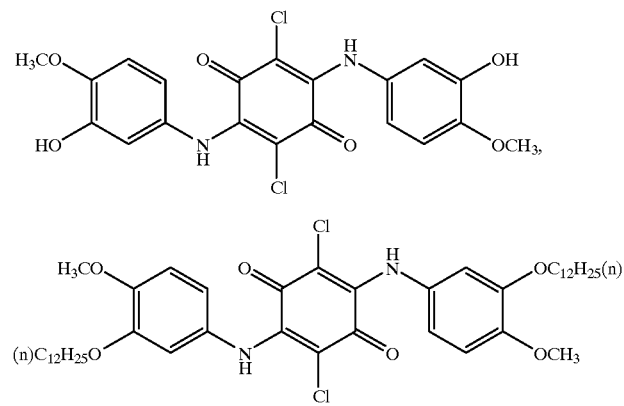

-continued

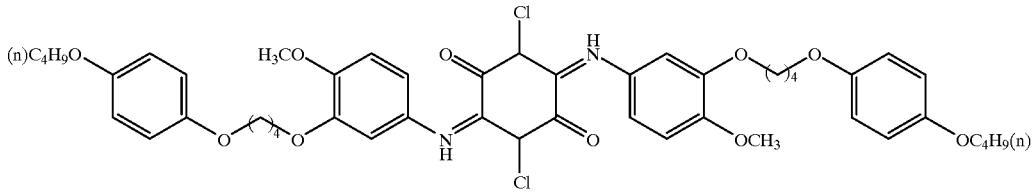

The dianilide compound represented by the formula (4) maybe prepared by conventional synthesis including the reaction of an aniline derivative represented by the formula (6) or (7) and a benzoquinone derivative represented by the formula (8).

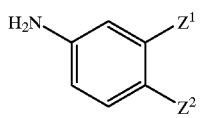

(6)

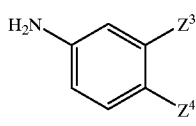

(7)

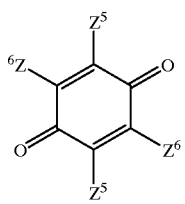

(8)

In the formulae, $Z^1$ to $Z^4$ are selected from the groups mentioned for $Z^1$ to $Z^4$ in the formula (4). $Z^5$ and $Z^6$ are suitably selected for providing the objective dianilide compound. In general, $Z^5$ is preferably the same group as X in the formula (4). $Z^6$ may be a hydrogen atom, a hydroxyl group, or a halogen atom, with a halogen atom being preferred, and a chlorine atom or a bromine atom being most preferred.

Examples of the benzoquinone derivative represented by the formula (8) include, for example, chloranyl, 2,5-dichloro-1,4-benzoquinone, 2,5-dibromo-3,6-dibenzamide-1,4-benzoquinone, and 2,5-dibromo-3,6-dicarboxylate-1,4-benzoquinone.

In the formula (5) representing the acid chloride used in the method of the present invention, A may suitably be selected from group (I) mentioned above depending on the objective triphenodioxazine compound.

Examples of the acid chloride represented by the formula (5) include, for example, benzoyl chloride, 4-buthylbenzoyl chloride, 4-methoxybenzoyl chloride, 4-butoxybenzoyl chloride, and 3,4,5-trimethoxybenzoyl chloride.

In the method of the present invention, the reaction of the dianilide compound represented by the formula (4) with the acid chloride represented by the formula (5) may be carried out, for example, by heating the dianilide compound and the acid chloride together in a solvent to have the dianilide compound undergo ring closure and to esterify at least one hydroxyl or methoxy group of the dianilide compound with the acid chloride. Through this reaction, almost all of the hydroxyl groups of the dianilide compound are esterified with the acid chloride. On the other hand, the conditions of the reaction will cause slight positional variation of the methoxy groups that are to be esterified, so that the yield of the esterified substituents may be adjusted to a desired level by suitably adjusting the concentration of the acid chloride, the reaction temperature, or the like conditions.

The mixing ratio of the dianilide compound represented by the formula (4) and the acid chloride represented by the formula (5) for the reaction may suitably be selected depending on the desired number of esterified substituents or the like factors. It is usually preferred that the amount of the acid chloride is equal to or larger than the amount of the dianilide compound in mole, and more preferably the amount of the acid chloride is not less than twice the amount of the dianilide compound in mole. The reaction temperature is usually in the range of 100–180° C., and preferably 130–180° C. The duration of the reaction is preferably 1 to 10 hours.

The reaction may be carried out in a solvent, for example, a polar organic solvent such as nitrobenzene, o-dichlorobenzene, dimethylformamide, or dimethylsulfoxide, with nitrobenzene and o-dichlorobenzene being preferable, and nitrobenzene being most preferable.

According to the method of the present invention, a triphenodioxazine compound represented by the formula (1) with X being a group other than a halogen atom may also be prepared, for example, by first synthesizing a triphenodioxazine compound represented by the formula (1) with X being a halogen atom according to the method above, and then treating the resulting compound with a variety of reagents to convert X into a group other than the halogen atom. More specifically, such a compound may be prepared by synthesizing a triphenodioxazine compound represented by the formula (1) with X being a chlorine or bromine atom, and then treating the resulting compound with metal (e.g. tin or iron) and acid (e.g. polyphosphoric acid) to convert X into a hydrogen atom; or by synthesizing a triphenodioxazine compound represented by the formula (1) with X being a bromine atom, and then treating the resulting compound with a metallocyanide (e.g. cuprous cyanide) to convert X into a cyano group.

Further, a triphenodioxazine compound represented by the formula (1) with X being a hydrogen atom may also be prepared directly by reacting a 2-hydroxyaniline derivative corresponding to the objective structure with 2,5-dihydroxy-1,4-benzoquinone.

The liquid crystal composition of the present invention at least contains a dichroic dye composed of the triphenodioxazine compound of the present invention, and a liquid-crystalline material.

The type and amount of the liquid-crystalline material for the liquid crystal composition of the present invention may suitably be selected depending on the objective liquid crystal phase. The liquid crystal phase may be a conventionally known phase such as a nematic, cholesteric, smectic, or discotic phase.

For the application of the liquid crystal composition to GH liquid crystal displays, liquid-crystalline materials which take a nematic, cholesteric, or smectic phase are preferably used, and those which take a cholesteric or nematic phase are particularly preferred. The type of a liquid crystal phase usually depends on the kind of a liquid-crystalline material, but in some cases, a small amount of additive may cause change in the liquid crystal phase. For example, addition of a small amount of an optically active material may sometimes cause expression of a cholesteric phase. Incidentally, the dielectric anisotropy of the liquid crystal composition of the present invention may either be positive or negative, depending on the type of the objective liquid crystal display element.

In the liquid crystal composition of the present invention, usually the content of the liquid-crystalline material is Preferably not less than 80% by weight, more preferably not less than 90% by weight, and most preferably not less than 95% by weight of the entire composition for giving a stable liquid crystal phase over a wide temperature range. The liquid-crystalline material may be a single compound or a mixture of two or more compounds, but generally a mixture of two or more compounds is preferably used for giving a stable liquid crystal phase over a wide temperature range.

Examples of the liquid-crystalline material include, for example, a variety of compounds such as biphenyl, phenylcyclohexane, phenylpyrimidine, or cyclohexylcyclohexane compounds which take a nematic or smectic phase, or mixtures thereof, as described in *Liquid Crystal Device Handbook,* Edited by Nihon Gakujutsu Shinkokai, 142th Committee (1989), p152–192, p715–722. Preferred examples of such material include the compounds represented by the following formulae or mixtures thereof:

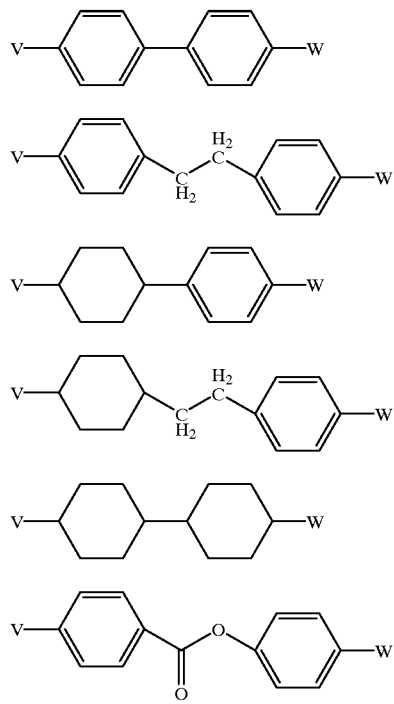

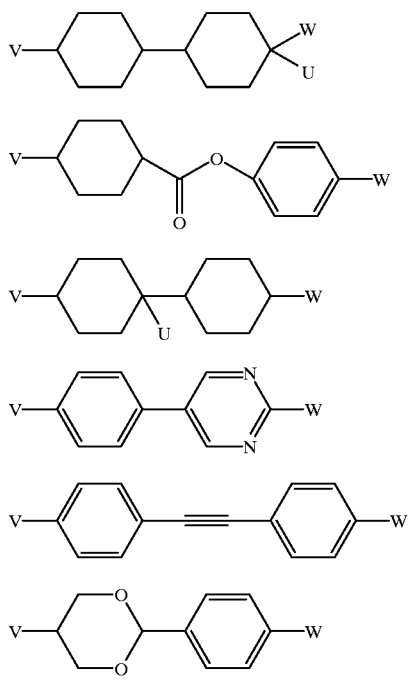

In the above formulae, one or more hydrogen atoms in a phenyl group may be substituted by a halogen atom such as a fluorine or chlorine atom, or a cyano group. V and W each stands for an alkyl group, an alkoxy group, an alkoxyalkyl group, an alkylphenyl group, an alkoxyalkylphenyl group, an alkoxyphenyl group, an alkylcyclohexyl group, an alkoxyalkylcyclohexyl group, an alkylcyclohexylphenyl group, a cyanophenyl group, a cyano group, a halogen atom, a fluoromethyl group, a fluoromethoxy group, an alkylphenylalkyl group, an alkoxyphenylalkyl group, an alkylcyclohexylalkyl group, an alkoxyalkoxyhexylalkyl group, an alkoxyphenylalkyl group, or an alkylcyclohexylphenylalkyl group. The center of optical activity may be in an alkyl or alkoxy chain of these groups. Further, in the groups mentioned for V and W, one or more hydrogen atoms in a phenyl or phenoxy group may be substituted by a halogen atom such as a fluorine or chlorine atom, or a cyano group. In the formulae, U stands for a hydrogen atom, a halogen atom, or a cyano group.

The liquid-crystalline material is not limited to the compounds mentioned above. For example, fluorine-containing liquid-crystalline materials having one or more fluorine atoms or fluorine-containing groups such as —$CF_3$ or —$OCF_3$ incorporated therein as substituents may be used, which are used preferably for thin film transistor liquid crystal displays (TFT.LCD).

The triphenodioxazine compound represented by the formula (1) used for the liquid crystal composition of the present invention may slightly fluctuate in purity depending on the kind of the dye or the synthesis process. The triphenodioxazine compound of 90 to 100% by weight purity may usually be used, but the purity is preferably 98 to 100% by weight, more preferably 99 to 100% by weight, and most preferably 99.5 to 100% by weight.

The content of the triphenodioxazine compound in the liquid crystal composition of the present invention is not particularly limited, and may suitably be selected depending on the kind of the triphenodioxazine compound, the objective Liquid crystal phase, or the like factors. The content of the compound is usually 0.01 to 10% by weight, preferably 0.01 to 5% by weight of the entire composition.

The liquid crystal composition of the present invention may optionally contain additional components such as an optically active material, or a stabilizer, if required, in addition to the triphenodioxazine compound and the liquid-crystalline material. The content of such additional components, if contained, needs to be controlled suitably so as not to disturb the expression of the liquid crystal phase.

The liquid crystal composition of the present invention may be prepared by mixing together the triphenodioxazine compound, the liquid-crystalline material, and other components, if any. The mixing may be carried out by a conventional manner. For example, the present liquid crystal composition may be prepared by heating the liquid-crystalline material to have it melt into an isotropic liquid, and dissolving the triphenodioxazine compound in the liquid through mixing.

The liquid crystal composition containing the triphenodioxazine compound of the present invention has a high dichroic ratio and a narrow light absorption band (the half-width of absorption). Therefore, liquid crystal display elements fabricated from this composition are capable of displaying a variety of color tones vividly, and are thus of high industrial value.

EXAMPLES

The present invention will now be explained in detail with reference to Examples and Comparative Examples, but the present invention is not limited to these.

(i) The dichroic ratio of a triphenodioxazine compound was determined by measuring the polarized light absorption spectra of cells, which had been produced as will be described later and charged with liquid crystal composition (1a) containing a triphenodioxazine compound or with corresponding liquid crystal composition (1b) not containing a triphenodioxazine compound. More specifically, absorption ($a_1$) of light polarized parallel to the direction in which the cell was rubbed, and absorption ($a_2$) of light polarized perpendicular to the direction in which the cell was rubbed, were measured over a predetermined waveband (300 to 800 nm). The difference in each peak absorption between the compositions (1a) and (1b) was taken as the absorption of the triphenodioxazine compound per se, and the dichroic ratio was determined by the formula below, with the difference in ($a_1$) between the compositions (1a) and (1b) being denoted by ($A_1$), whereas difference in ($a_2$) between the compositions (1a) and (1b) being denoted by ($A_2$):

Dichroic Ratio=$(A_1)/(A_2)$

<Fabrication of Cells>

To one side of a quartz plate, a polyimide alignment film material (manufactured by HITACHI CHEMICAL CO., LTD., trade name "LX1400") was applied in a thickness of about 20 nm, and heated to obtain a substrate having a polyimide alignment film. The resulting substrate was rubbed with a cloth in one direction. Two of such substrate were prepared, and spaced 17 to 24 μm apart with their alignment films facing each other and with the directions of rubbing being aligned. An adhesive containing a spacer was applied around the periphery of the substrates and hardened to fix the substrates each other, thereby obtaining a cell for measurement.

(ii) The half-width of absorption was calculated by determining the spectrum of absorption of the light polarized parallel to the direction in which the cell was rubbed, and introducing in the following formula the values of the wavelengths $W_1$ and $W_2$ of a certain peak at half of its height (absorption):

Half-width of Absorption=$|W_1-W_2|$

Example 1

<Synthesis of Dianilide Compound>

To 100 g of ethanol, 10 g of 2-methoxy-5-aminophenol, 10.6 g of chloranyl, and 12.7 g of sodium acetate were added, and the resulting mixture was refluxed for 5 hours. The reacted mixture was poured into 400 ml of water, and filtered. The reactant left on the filter was washed with water, warm water, a 5% hydrochloric acid aqueous solution, and water again, and then dried, thereby obtaining 25.3 g of dianilide compound represented by the formula (9).

From the mass spectrum (FDMS) of the compound thus obtained, the mass number was determined to be 450, and the molecular structure of the compound was determined.

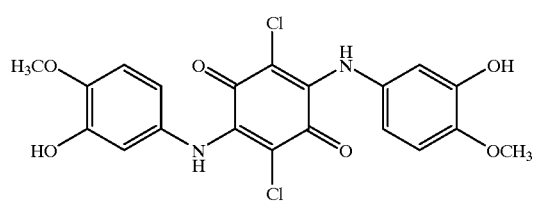

(9)

<Synthesis of Triphenodioxazine Compound>

To 20 g of nitrobenzene, 0.9 g of the dianilide compound and 2.1 g of 4-butoxybenzoyl chloride were added. The resulting mixture was kept at 170° C. for 2 hours, then allowed to cool, and mixed with 400 ml of n-hexane. The resulting mixture was filtered, and the separated precipitate was purified repeatedly by silica gel thin layer chromatography, thereby obtaining a triphenodioxazine compound. In the thin layer chromatography, a mixed solvent of toluene and ethyl acetate (9:1) was used as a solvent for elution.

Structure of the compound thus obtained was determined from the mass spectrum (FDMS) and the nuclear magnetic resonance ($^1$H-NMR) spectrum of the compound. The FDMS of the obtained compound indicated the mass number of 960. in the $^1$H-NMR spectrum of the compound determined in a CDCl$_3$ solution, three distinct signals for the triphenodioxazine ring protons were observed at 7.32, 7.5, and 7.63. Neither of these signals forms a doublet indicating coupling between ortho-positions, and the triphenodioxazine ring protons existed at 1-, 4-, 8-, and 11-positions in the formula (1).

The results of the $^1$H-NMR (200 MHz) measurement were as follows:

7.9–8.2 ppm (6H, m. phenylene ring), 7.63 ppm (1H, s. triphenodioxazine ring), 7.5 ppm (1H, s. triphenodioxazine ring), 7.32 ppm (1 H, s. triphenodioxazine ring), 6.75–7 ppm (7H, m. triphenodioxazine ring and phenylene ring), 3.9–4.1 ppm (6H, br. —O—CH$_2$—), 3.90 ppm (3H, s. —O—CH$_3$), 1.62 ppm (6H, br. —CH$_2$—), 1.25 ppm (6H, br. —CH$_2$—), 0.96 ppm (9H, br. —CH$_3$). The chemical shift was calculated using tetramethylsilane as a reference (0 ppm).

From the results mentioned above, the structure of the obtained triphenodioxazine compound was determined as shown below:

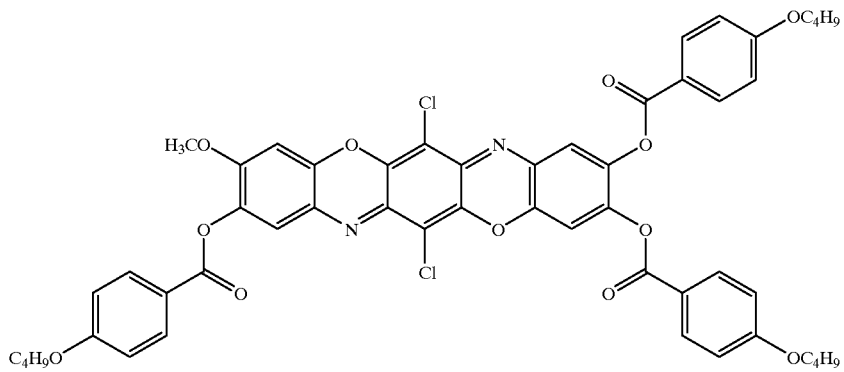

<Evaluation of Dichroic Ratio>

A liquid crystal composition prepared by mixing 0.1% by weight of the obtained triphenodioxazine compound with a liquid crystal composition E7 (manufactured by MERCK JAPAN LIMITED), and the liquid crystal composition E7 (manufactured by MERCK JAPAN LIMITED) per se were respectively sealed in a cell, and the absorption, the dichroic ratio, and the half-width of absorption were determined. Further, the same experiments were performed using a liquid crystal composition E9 (manufactured by MERCK JAPAN LIMITED) in place of the liquid crystal composition E7. The results are shown in Table 1. The polarized light absorption spectra of the liquid crystal composition prepared by mixing 0.1% by weight of the triphenodioxazine compound in the liquid crystal composition E9 were shown in FIG. 1. In the FIG. 1 refers to the spectrum of absorption of the light polarized parallel to the direction in which the cell was rubbed; 2 the spectrum of absorption of the light polarized perpendicular to the direction in which the cell was rubbed; 3 wavelength $W_1$; 4 wavelength $W_2$; 5 the half-width of absorption; and 6 the peak of the absorption spectrum.

Example 2

<Synthesis of Triphenodioxazine Compound>

To 20 g of nitrobenzene, 1.0 g of the dianilide compound prepared in Example 1 and 1.7 g of benzoyl chloride were added. The resulting mixture was kept at 170° C. for 2 hours, then allowed to cool, and filtered. The separated precipitate was purified repeatedly by silica gel thin layer chromatography, thereby obtaining a triphenodioxazine compound. In the thin layer chromatography, a mixed solvent of toluene and ethyl acetate (9:1) was used as a solvent for elution.

Structure of the compound thus obtained was determined from the FDMS and the $^1$H-NMR spectrum of the compound. The FDMS of the obtained compound indicated the mass number of 744. The results of the $^1$H-NMR (200 MHz) measurement were as follows:

8.02–8.25 ppm (6H, m. phenyl ring), 7.37–7.79 ppm (12H, m. triphenodioxazine ring and phenyl ring), 6.90 ppm (H, s. triphenodioxazine ring), 3.91 ppm (3H, s. —O—CH$_3$).

From the results mentioned above, the structure of the obtained triphenodioxazine compound was determined as shown below:

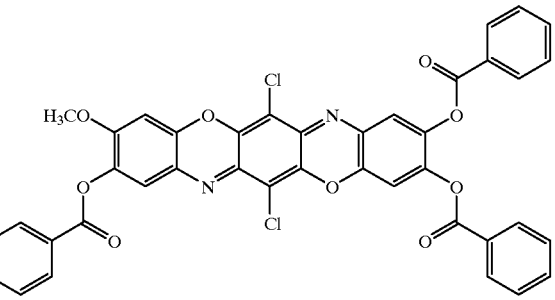

<Evaluation of Dichroic Ratio>

A liquid crystal composition was prepared by mixing 0.1% by weight of the obtained triphenodioxazine compound with the cyanobiphenyl liquid crystal composition E7 (manufactured by MERCK JAPAN LIMITED) The obtained liquid crystal composition was sealed in a cell, and subjected to the same measurements as in Example 1. The results are shown in Table 1.

Example 3

<Synthesis of Triphenodioxazine Compound>

To 74.5 g of nitrobenzene, 2.5 g of the dianilide compound prepared in Example 1 and 2.3 g of 4-(n) buthylbenzoyl chloride were added. The resulting mixture was kept at 170–180° C. for 11 hours, then allowed to cool, and filtered. The separated precipitate was purified repeatedly by silica gel thin layer chromatography, thereby obtaining a triphenodioxazine compound. In the thin layer chromatography, chloroform was used as a solvent for elution.

Structure of the compound thus obtained was determined from the FDMS and the $^1$H-NMR spectrum of the compound. The FDMS of the obtained compound indicated the mass number of 766. The results of the $^1$H-NMR (200 MHz, CDCl$_3$) measurement were as follows:

8.1–8.15 ppm (4H, d. phenylene ring), 7.55 ppm (1H, s. triphenodioxazine ring), 7.49 ppm (1H, s. triphenodioxazine ring), 7.31–7.36 ppm (4H, d. phenylene ring), 6.90 ppm (1H, s. triphenodioxazine ring), 6.88 ppm (1H, s. triphenodioxazine ring), 3.89–3.91 ppm (6H, br. —O—CH$_3$), 2.68–2.76 ppm (4H, t. —CH$_2$—), 1.25 ppm (8H, br. —CH$_2$—), 0.92–0.99 ppm (6H, t. —CH$_3$).

From the results mentioned above, the structure of the obtained triphenodioxazine compound was determined as shown below:

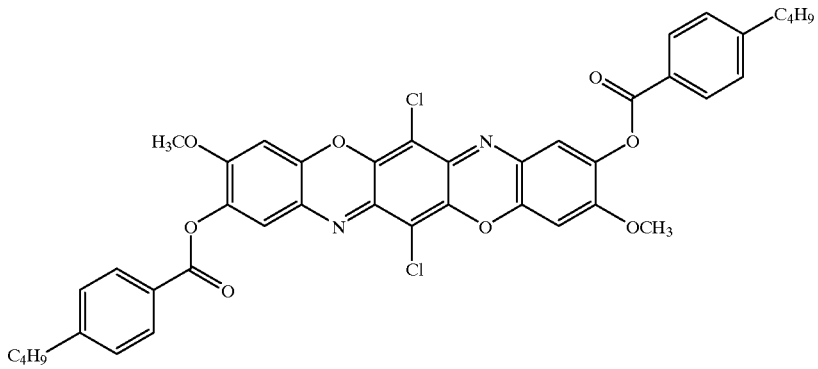

<Evaluation of Dichroic Ratio>

A liquid crystal composition was prepared by mixing 0.1% by weight of the obtained triphenodioxazine compound with the liquid crystal composition E7 (manufactured by MERCK JAPAN LIMITED). The obtained liquid crystal composition was sealed in a cell, and subjected to the same measurements as in Example 1. The results are shown in Table 1.

Example 4
<Synthesis of Triphenodioxazine Compound>

To 20 g of nitrobenzene, 0.9 g of the dianilide compound prepared in Example 1 and 2.3 g of 4-methoxybenzoyl chloride were added. The resulting mixture was kept at 170° C. for 3 hours, then allowed to cool, and mixed with 400 ml of n-hexane. The resulting mixture was filtered, and the separated precipitate was purified repeatedly by silica gel thin layer chromatography, thereby obtaining a triphenodioxazine compound. In the thin layer chromatography, a mixed solvent of toluene and ethyl acetate (9:1) was used as a solvent for elution.

Structure of the compound thus obtained was determined from the FDMS and the $^1$H-NMR spectrum of the compound. The FDMS of the obtained compound indicated the mass number of 834. The results of the $^1$H-NMR (200 MHz) measurement were as follows:

7.9–8.35 ppm (6H, m. phenylene ring), 7.78 ppm (1H, s. triphenodioxazine ring), 7.5 ppm (1H, s. triphenodioxazine ring), 7.39 ppm (1H, s. triphenodioxazine ring), 6.73–7.03 ppm (7H, m. triphenodioxazine ring and phenylene ring), 3.77–3.92 ppm (12H, m. —O—CH$_3$).

From the results mentioned above, the structure of the obtained triphenodioxazine compound was determined as shown below:

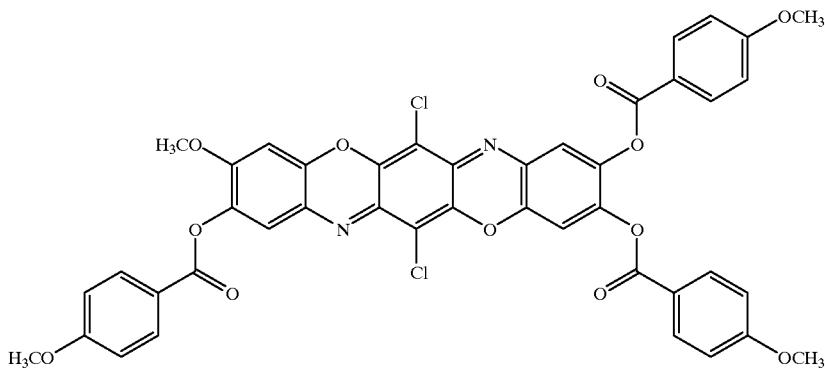

<Evaluation of Dichroic Ratio>

A liquid crystal composition was prepared by mixing 0.1% by weight of the obtained triphenodioxazine compound with the liquid crystal composition E7 (manufactured by MERCK JAPAN LIMITED). The obtained liquid crystal composition was sealed in a cell, and subjected to the same measurements as in Example 1. The results are shown in Table 1.

Example 5

<Synthesis of Dianilide Compound>

To 70 g of ethanol, 5.5 g of 3-methoxy-4-dodecyloxyaniline, 2.6 g of chloranyl, and 2.6 g of sodium acetate were added, and the resulting mixture was refluxed for 5 hours. The reacted mixture was poured into 300 ml of water, and filtered. The reactant left on the filter was washed with water, warm water, a 5% hydrochloric acid aqueous solution, and water again, and then dried, thereby obtaining 11.3 g of dianilide compound represented by the formula (10):

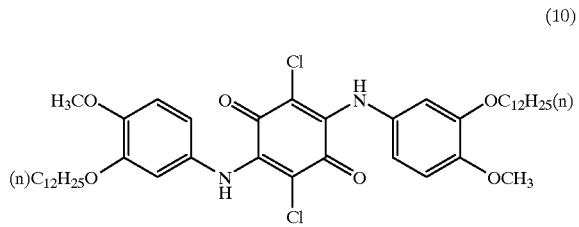
(10)

<Synthesis of Triphenodioxazine Compound>

To 40 g of nitrobenzene, 1.7 g of the obtained dianilide compound and 0.4 g of benzoyl chloride were added. The resulting mixture was kept at 150–160° C. for 4 hours, then allowed to cool, and filtered. The separated precipitate was purified repeatedly by silica gel thin layer chromatography, thereby obtaining a triphenodioxazine compound. In the thin layer chromatography, chloroform was used as a solvent for elution.

Structure of the compound thus obtained was determined from the FDMS and the $^1$H-NMR spectrum of the compound. The FDMS of the obtained compound indicated the mass number of 963 corresponding to the theoretical number plus one proton. The results of the $^1$H-NMR (500 MHz) measurement were as follows:

8.18–8.20 ppm (4H, d. phenylene ring), 7.62–7.66 ppm (2H, t. phenylene ring), 7.49–7.53 ppm (4H, t. phenylene ring), 7.21 ppm (2H, s. triphenodioxazine ring), 7.16 ppm (2H, s. triphenodioxazine ring), 4.0 ppm (4H, br. —O—CH$_2$—), 1.7 ppm (4H, br. —CH$_2$—), 1.26 ppm (36H, br. —CH$_2$—), 0.84–0.92 ppm (6H, br. —CH$_3$).

From the results mentioned above, the structure of the obtained triphenodioxazine compound was determined as shown below:

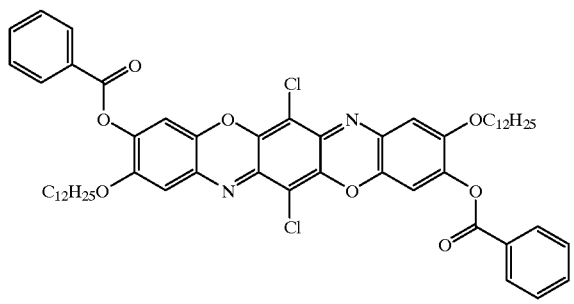

<Evaluation of Dichroic Ratio>

A liquid crystal composition was prepared by mixing 0.1% by weight of the obtained triphenodioxazine compound with the liquid crystal composition E7 (manufactured by MERCK JAPAN LIMITED). The obtained liquid crystal composition was sealed in a cell, and subjected to the same measurements as in Example 1. The results are shown in Table 1.

Example 6

<Synthesis of Dianilide Compound>

A dianilide compound was prepared by the same operation as in Example 5 except that 3-methoxy-4-octyloxyaniline was used instead of 3-methoxy-4-dodecyloxyaniline.

<Synthesis of Triphenodioxazine Compound>

A triphenodioxazine compound was prepared by the same operation as in Example 5 except that the dianilide compound obtained above was used in place of the dianilide compound used in Example 5, and 4-buthylbenzoyl chloride was used in place of benzoyl chloride.

Structure of the compound thus obtained was determined from the FDMS and the $^1$H-NMR spectrum of the compound. The FDMS of the obtained compound indicated the mass number of 962. The results of the $^1$H-NMR (200 MHz) measurement were as follows:

8.05–8.15 ppm (4H, d. phenylene ring), 7.28–7.35 ppm (4H, d. phenylene ring), 7.23 ppm (2H, s. triphenodioxazine ring), 7.15 ppm (2H, s. triphenodioxazine ring), 4.0 ppm (4H, t. —O—CH$_2$—), 2.71 ppm (4H, t. —CH$_2$—), 1.6–1.75 ppm (8H, m. —CH$_2$—), 1.1–1.5 ppm (24H, m. —CH$_2$—), 0.8–1 ppm (12H, m. —CH$_3$).

From the results mentioned above, the structure of the obtained triphenodioxazine compound was determined as shown below:

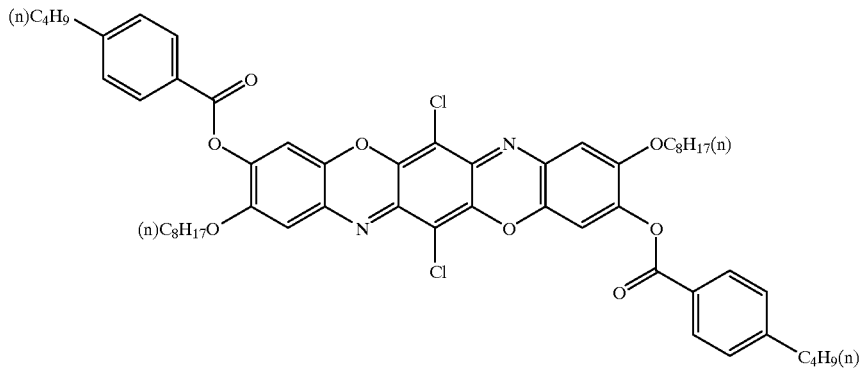

<Evaluation of Dichroic Ratio>

A liquid crystal composition was prepared by mixing 0.1% by weight of the obtained triphenodioxazine compound with the liquid crystal composition E7 (manufactured by MERCK JAPAN LIMITED). The obtained liquid crystal composition was sealed in a cell, and subjected to the same measurements as in Example 1. The results are shown in Table 1.

Example 7

<Synthesis of Triphenodioxazine Compound>

A triphenodioxazine compound was prepared by the same operation as in Example 5 except that 3,4,5-trimethoxybenzoyl chloride was used in place of the benzoyl chloride.

Structure of the compound thus obtained was determined from the FDMS and the $^1$H-NMR spectrum of the compound. The FDMS of the obtained compound indicated the mass number of 1143. The results of the $^1$H-NMR (200 MHz) measurement were as follows:

7.46 ppm(4H, s. phenylene ring), 7.26 ppm (2H, s. triphenodioxazine ring), 7.18 ppm (2H, s. triphenodioxazine ring), 3.96–4.1 ppm (4H, t. —O—CH$_2$—), 3.95 ppm (18H, s. —O—CH$_3$), 1.65–1.8 ppm (4H, t. —CH$_2$—), 1.1–1.4 ppm (36H, br. —CH$_2$—), 0.8–0.95 ppm (6H, t. —CH$_3$).

From the results mentioned above, the structure of the obtained triphenodioxazine compound was determined as shown below:

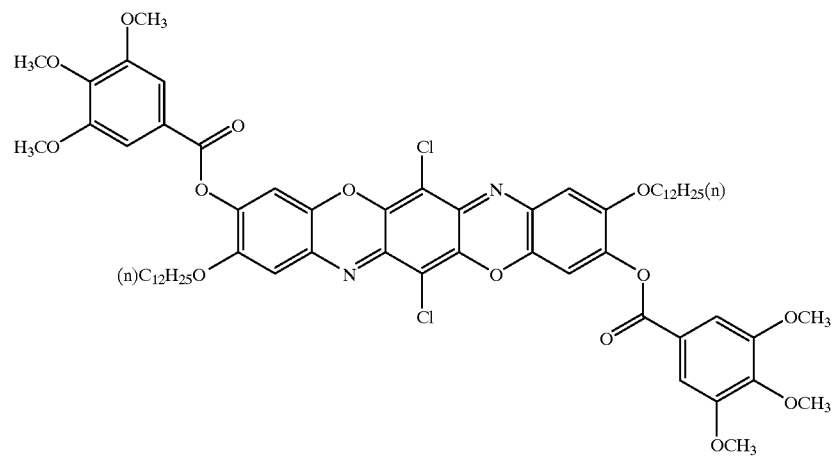

<Evaluation of Dichroic Ratio>

A liquid crystal composition was prepared by mixing 0.1% by weight of the obtained triphenodioxazine compound with the liquid crystal composition E7 (manufactured by MERCK JAPAN LIMITED). The obtained liquid crystal composition was sealed in a cell, and subjected to the same measurements as in Example 1. The results are shown in Table 1.

Example 8
<Synthesis of Dianilide Compound>

A dianilide compound represented by the formula (12) was prepared by the same operation as in Example 5 except that an aniline compound represented by the formula (11) was used in place of 3-methoxy-4-dodecyloxyaniline.

the dianilide compound used in Example 5, and 4-butylbenzoyl chloride was used in place of the benzoyl chloride.

Structure of the compound thus obtained was determined from the FDMS and the $^1$H-NMR spectrum of the compound. The FDMS of the obtained compound indicated the mass number of 1179. The results of the $^1$H-NMR (200 MHz) measurement were as follows:

8.05–8.15 ppm (4H, d. phenylene ring), 7.28–7.35 ppm (4H, d. phenylene ring), 7.25 ppm (2H, s. triphenodioxazine ring), 7.16 ppm (2H, s. triphenodioxazine ring), 6.7–6.83 ppm (8H, m. phenylene ring), 4.09 ppm (4H, t. —O—CH$_2$—), 3.75–3.95 ppm (8H, m. —O—CH$_2$—), 2.69

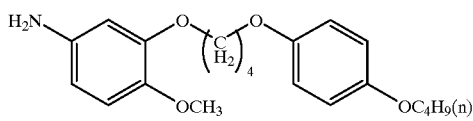

(11)

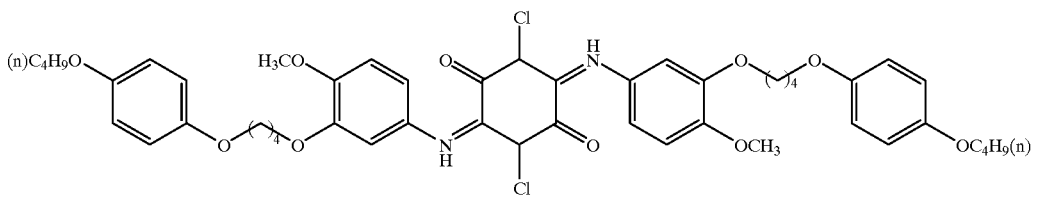

(12)

<Synthesis of Triphenodioxazine Compound>

A triphenodioxazine compound was prepared by the same operation as in Example 5 except that the dianilide compound represented by the formula (12) was used in place of ppm (4H, t. —CH$_2$—), 1.25–1.95 ppm (24H, m. —CH$_2$—), 0.9–1.05 ppm (12H, m. —CH$_3$).

From the results mentioned above, the structure of the obtained triphenodioxazine compound was determined as shown below:

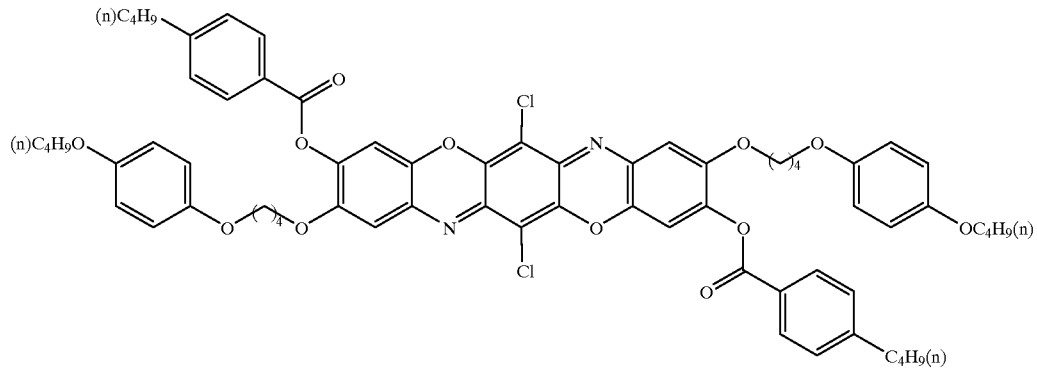

<Evaluation of Dichroic Ratio>

Liquid crystal compositions were prepared by mixing 0.1% by weight of the obtained triphenodioxazine compound with each of the liquid crystal composition E7 (manufactured by MERCK JAPAN LIMITED), liquid crystal composition E9 (manufactured by MERCK JAPAN LIMITED), and liquid crystal composition ZLI1132 (manufactured by MERCK JAPAN LIMITED). Each of the obtained liquid crystal compositions was separately sealed in a cell, and subjected to the same measurements as in Example 1. The results are shown in Table 1.

Comparative Example 1

<Synthesis of Dianilide Compound>

To 50 g of ethanol, 1.6 g of an aniline compound represented by the formula (13), 0.6 g of chloranyl, and 0.6 g of sodium acetate were added, and the resulting mixture was refluxed for 7 hours. The reacted mixture was poured into 100 ml of water, and filtered. The reactant left on the filter was washed with water, warm water, a 5% hydrochloric acid aqueous solution, and water again, and then dried, thereby obtaining 1.4 g of dianilide compound represented by the formula (14):

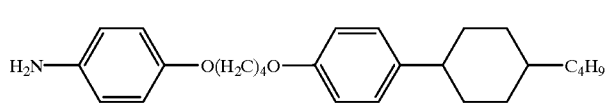

(13)

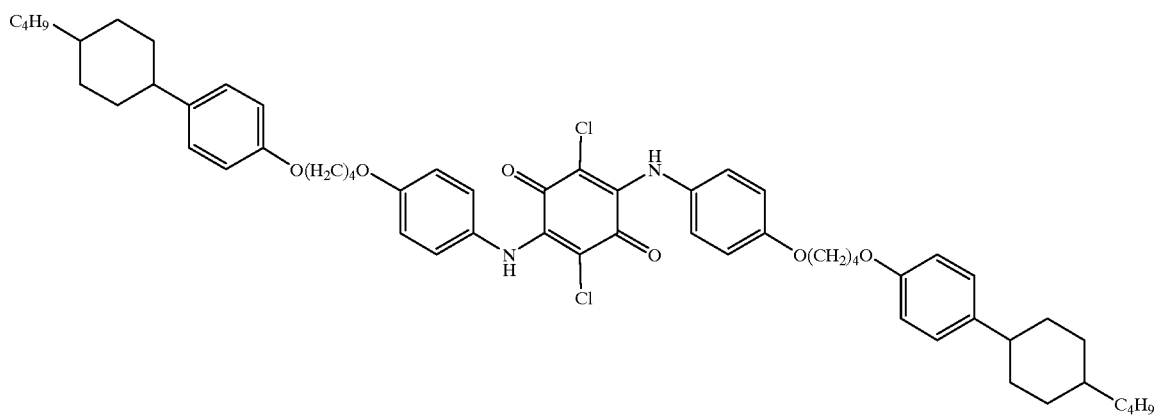

(14)

<Synthesis of Triphenodioxazine Compound>

To 40 g of nitrobenzene, 1.4 g of the obtained dianilide compound and 0.3 g of benzoyl chloride were added. The resulting mixture was kept at 150–160° C. for 4 hours, then allowed to cool, and filtered. The separated precipitate was purified repeatedly by silica gel column chromatography, thereby obtaining a triphenodioxazine compound. Structure of the dye thus obtained was determined from the FDMS as shown below:

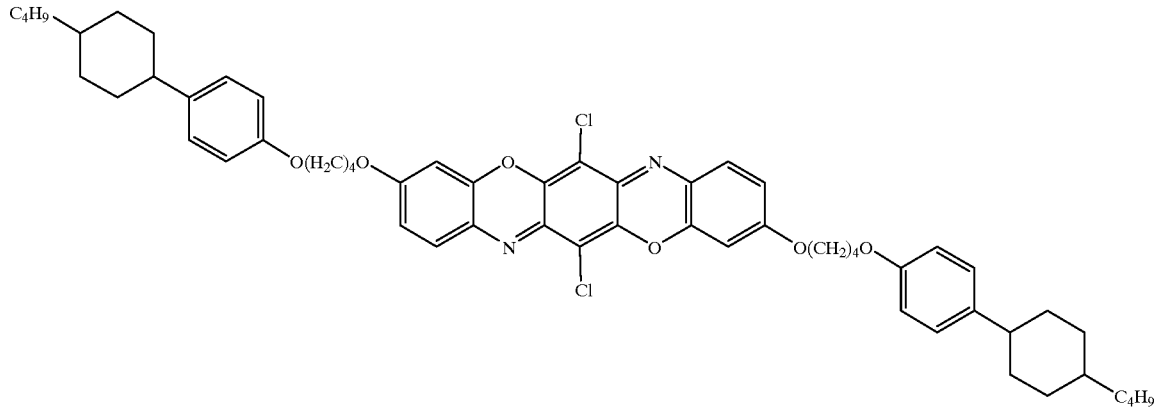

<Evaluation of Dichroic Ratio>

A liquid crystal composition was prepared by mixing 0.1% by weight of the obtained triphenodioxazine dye with the liquid crystal composition E7 (manufactured by MERCK JAPAN LIMITED). The obtained liquid crystal composition was sealed in a cell, and subjected to the same measurements as in Example 1. The results are shown in Table 1.

Comparative Example 2

A liquid crystal composition was prepared by mixing 0.1% by weight of a triphenodioxazine dye represented by the formula (15) with the liquid crystal composition E7 (manufactured by MERCK JAPAN LIMITED). The obtained liquid crystal composition was sealed in a cell, and subjected to the same measurements as in Example 1. The results are shown in Table 1.

(15)

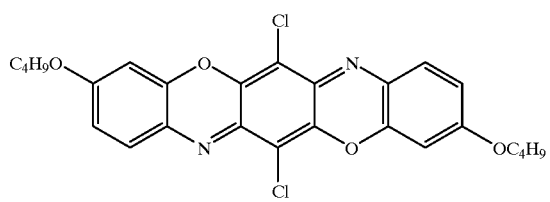

Comparative Example 3
<Evaluation of Dichroic Ratio>

A liquid crystal composition was prepared by mixing 0.1% by weight of an azo dye represented by the formula (16) (manufactured by NIPPON KANKOH-SHIKISO KENKYUSHO CO., LTD., trade name G205). The obtained liquid crystal composition was sealed in a cell, and subjected to the same measurements as in Example 1. The results are shown in Table 1.

TABLE 1

(16)

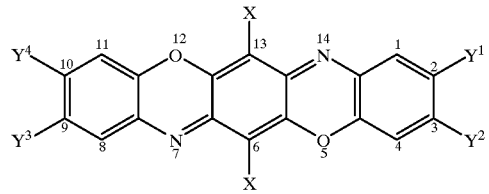

| | Kind of Liquid Crystal Composition | Peak Absorption (nm) | Dichroic Ratio | Half-width of Absorption (nm) |
|---|---|---|---|---|
| Example 1 | E7 | 551 | 9.3 | 70 |
| | E9 | 551 | 10.4 | 70 |
| Example 2 | E7 | 550 | 6.3 | 70 |
| Example 3 | E7 | 557 | 6.0 | 74 |
| Example 4 | E7 | 550 | 6.3 | 60 |
| Example 5 | E7 | 565 | 7.7 | 70 |
| Example 6 | E7 | 567 | 7.8 | 66 |
| Example 7 | E7 | 566 | 6.3 | 67 |
| Example 8 | E7 | 566 | 9.3 | 65 |
| | E9 | 567 | 11.0 | 67 |
| | ZLI1132 | 563 | 9.8 | 71 |
| Comp. Ex. 1 | E7 | 552 | 3.3 | 60 |
| Comp. Ex. 2 | E7 | 552 | 3.4 | 61 |
| Comp. Ex. 3 | E7 | 505 | 11.3 | 120 |

Although the present invention has been described with reference to the pre-erred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A triphenodioxazine compound represented by the formula (1):

(1)

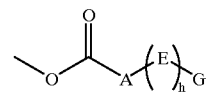

wherein each $Y^1$ to $Y^4$ stands for a group represented by the formula (2) or (3) with at least one of $Y^1$ to $Y^4$ being a group represented by the formula (2); X stands for a hydrogen atom, a chlorine atom, a bromine atom or a fluorine atom (2)

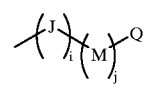

(3)

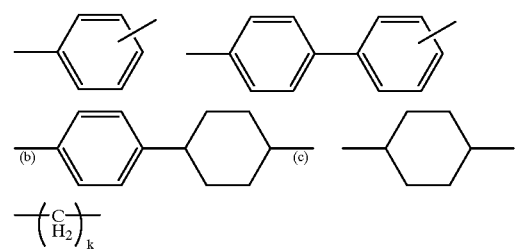

wherein h is an integer of 1, i is an integer of 1 to 2, and j is an integer of 0 to 2, provided that the sum of i and j is not more than 4; A stands for a group selected from group (I) consisting of:

(I)

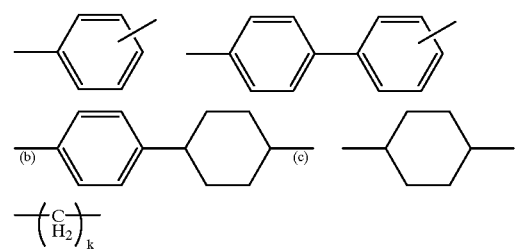

wherein k is an integer of 1 to 6; one or two of hydrogen atoms in a phenylene group may be substituted by an alkyl group having 1 to 12 carbon atoms, an alkoxy group having 1 to 12 carbon atoms, a perfluoroalkyl group having 1 to 6 carbon atoms, or a halogen atom; end (a) binds to E and end (b) binds to the ester group in the formula (2);

each of E, J, and M stands for a group selected from group (II) consisting of:

(II)

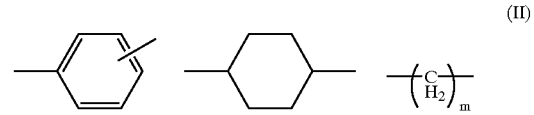

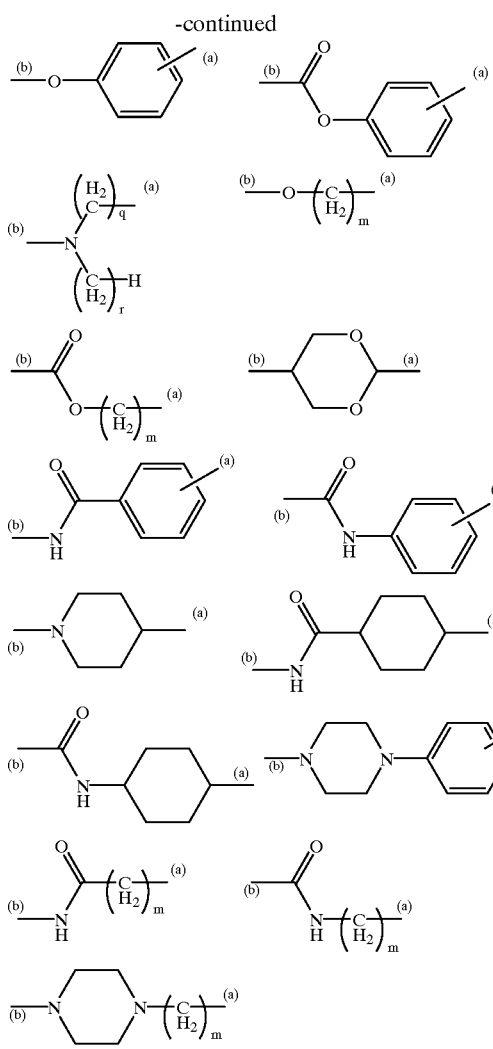

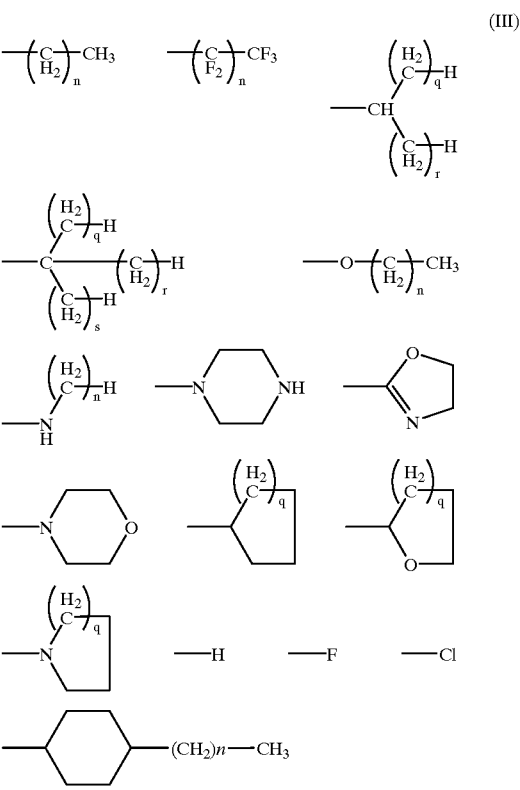

wherein m is an integer of 1 to 12, and each of q and r is an integer of 1 to 8; one or more hydrogen atoms in a phenylene group may be substituted by an alkyl group having 1 to 6 carbon atoms, an alkoxy group having 1 to 6 carbon atoms, perfluoroalkyl group having 1 to 6 carbon atoms, or a halogen atom; when E in the formula (2) is a group having ends (a) and (b) selected from group (II), end (a) binds to G or E and end (b) binds to A or E; when J in the formula (3) is a group having ends (a) and (b) selected from group (II), end (a) binds to M, J or Q in the formula (3) and end (b) binds to J or the triphenodioxazine skeleton; when M in the formula (3) is a group having ends (a) and (b) selected from group (II), end (a) binds to M or Q and end (b) binds to M or J; G and Q each stands for a group selected from group (III) consisting of:

wherein n is an integer of 1 to 12, and each of q, r, and s is an integer of 1 to 8.

2. The triphenodioxazine compound of claim 1 wherein said triphenodioxazine compound is a compound represented by the formula selected from the group consisting of:

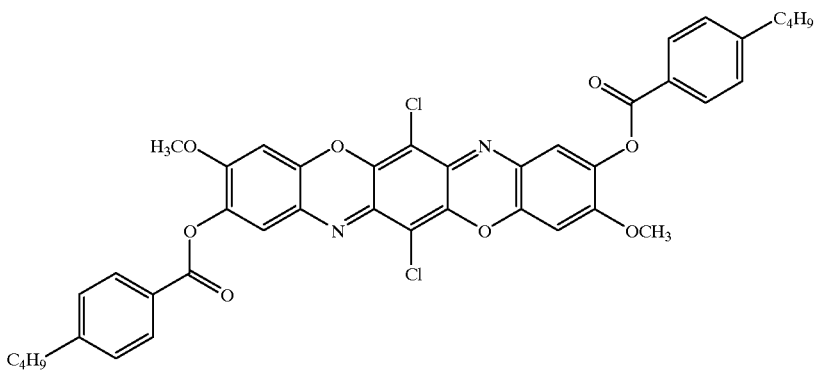

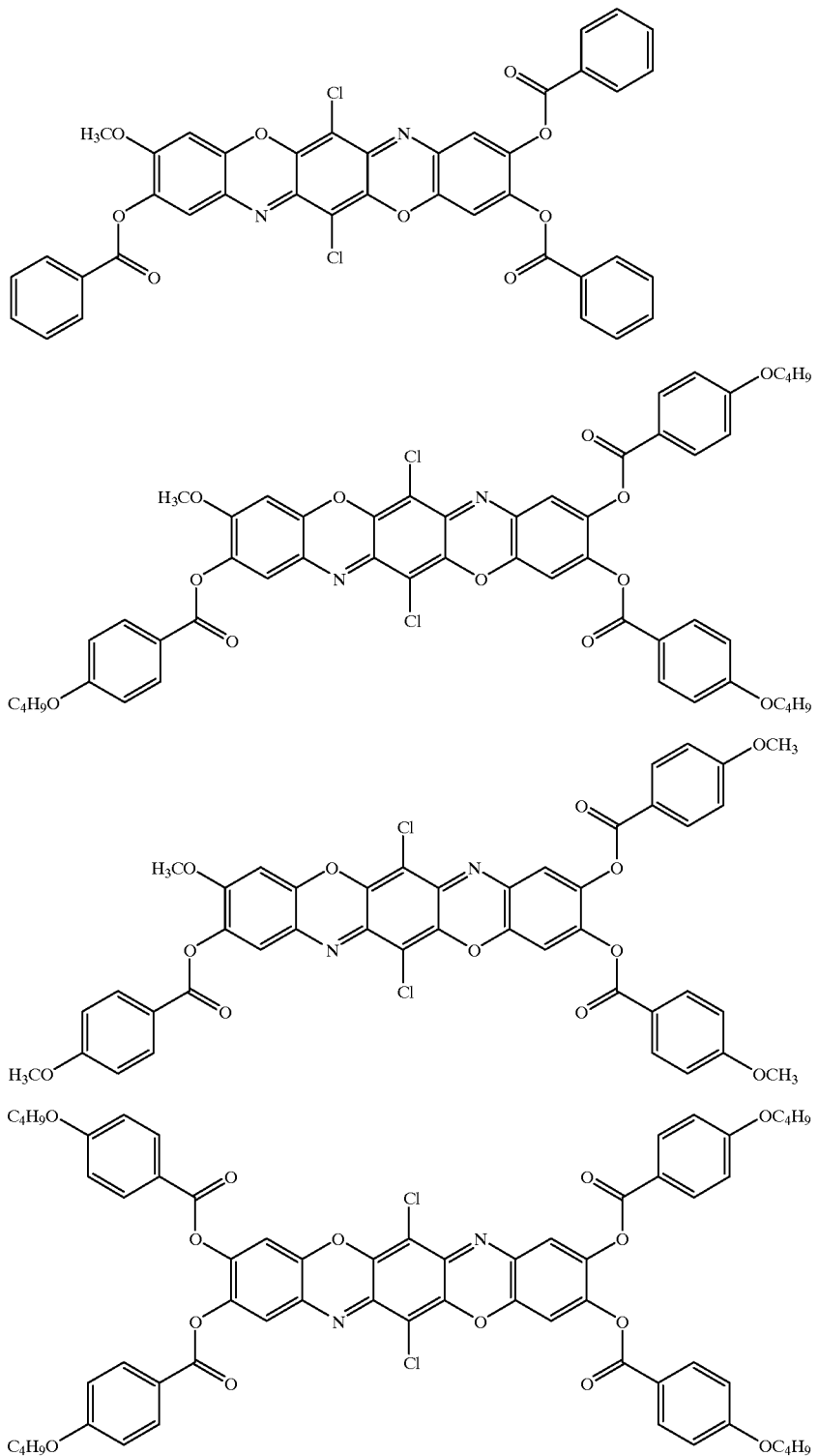

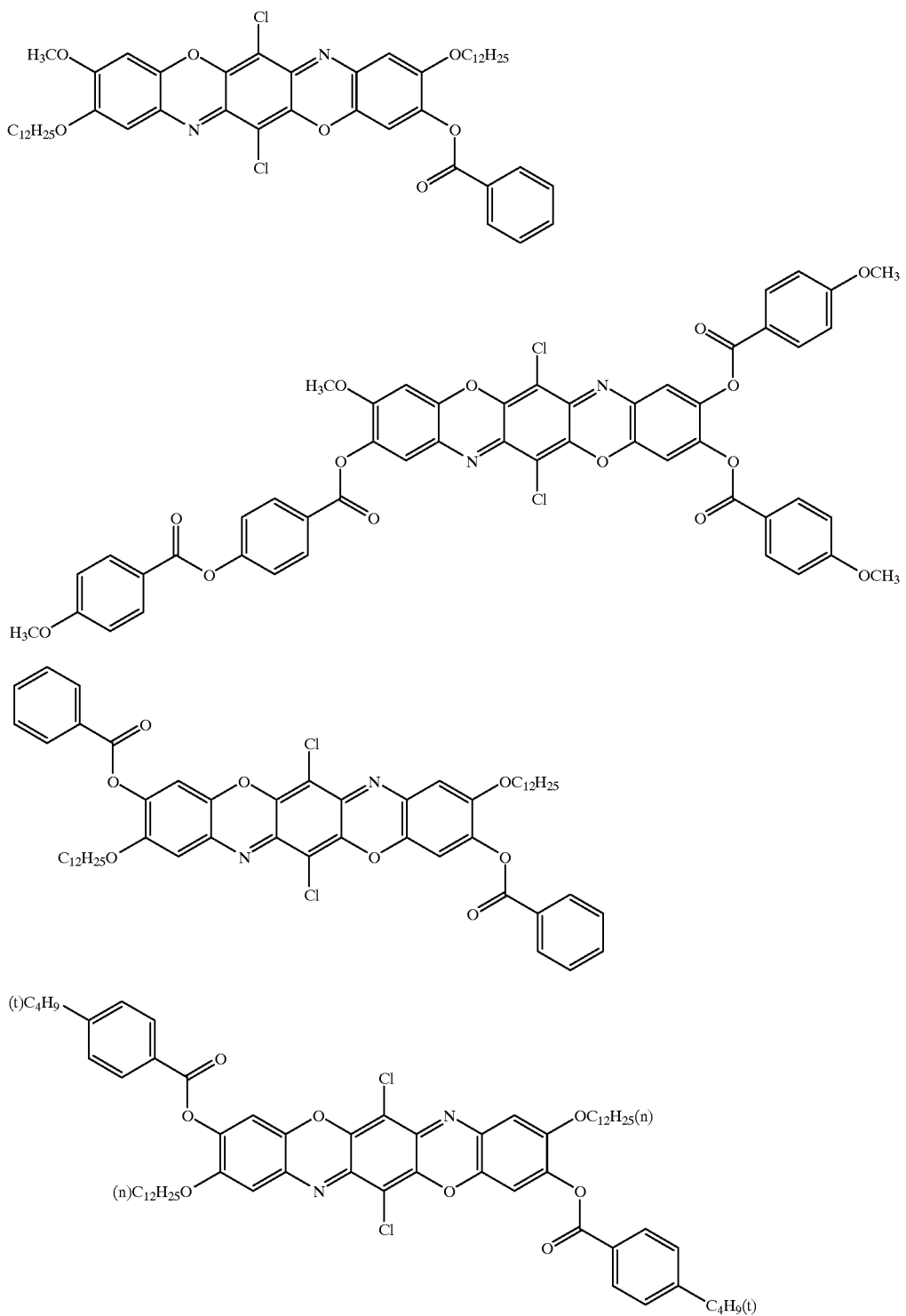

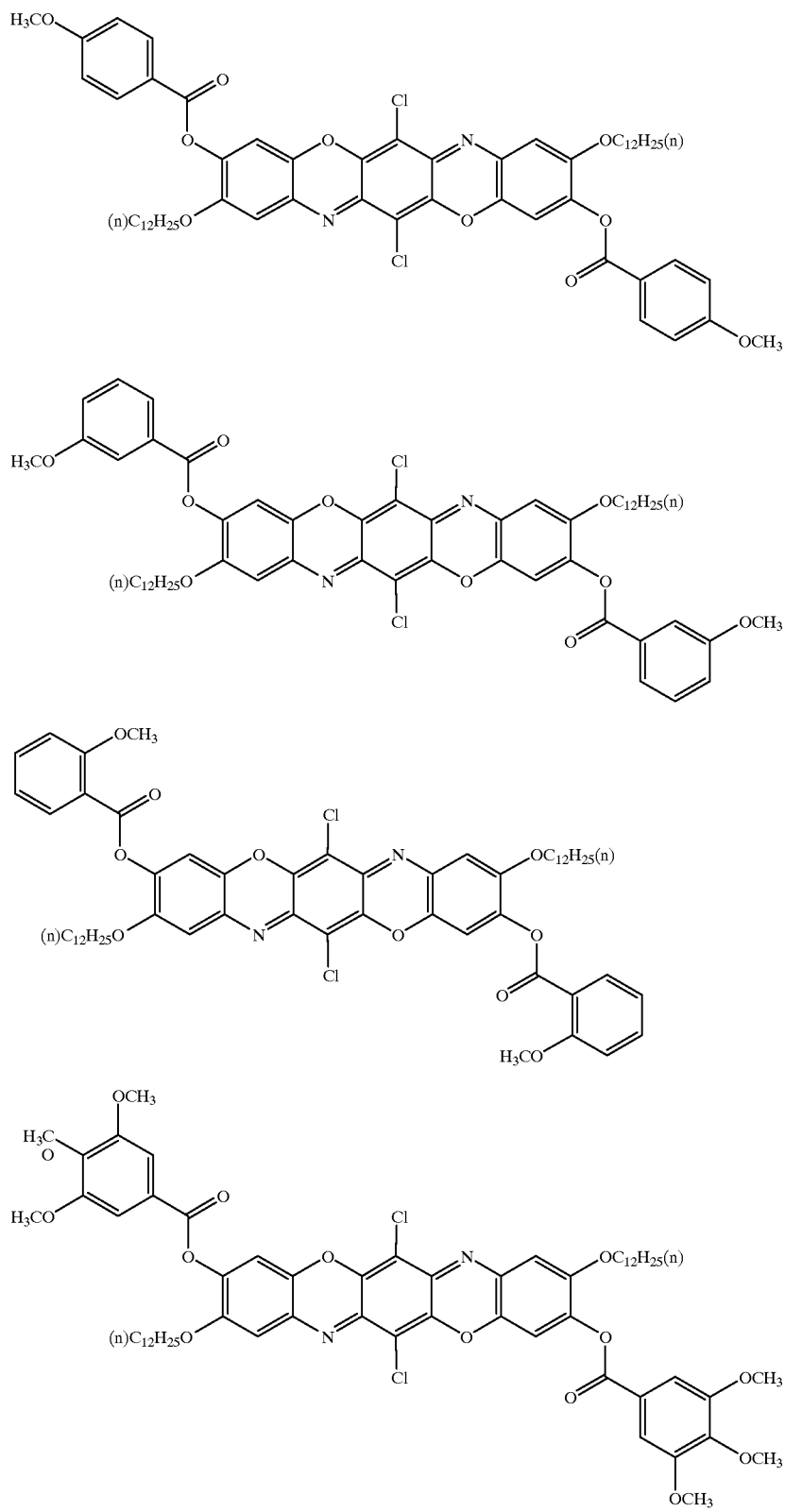

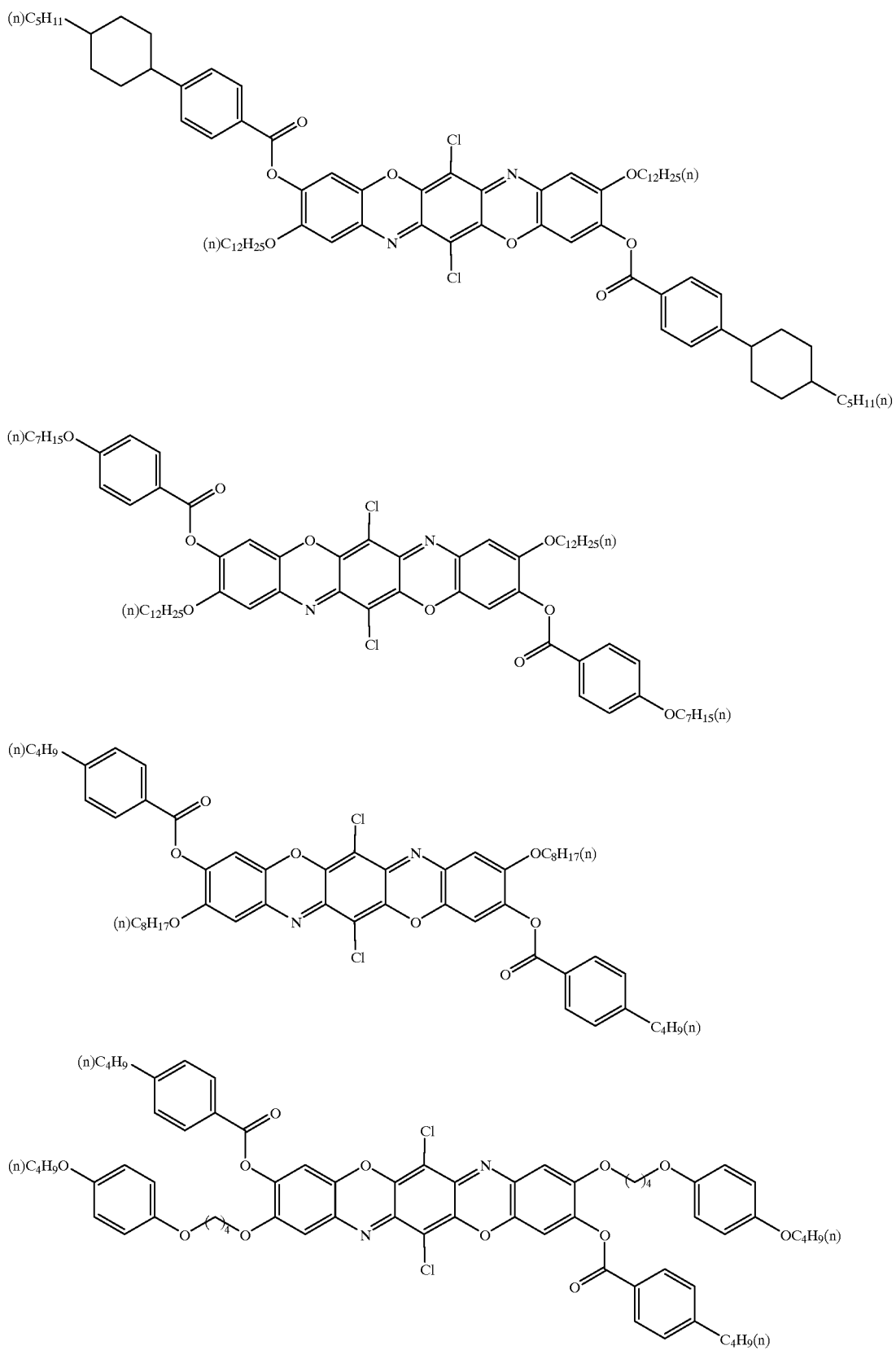

-continued

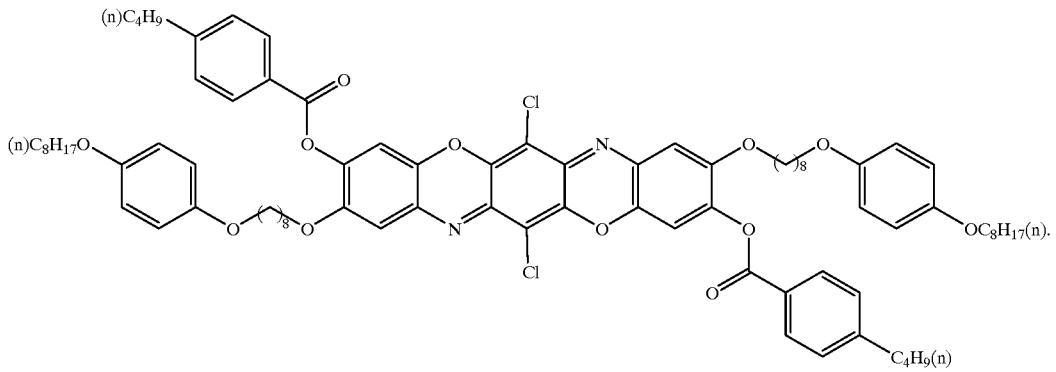

3. A dichroic dye consisting of the triphenodioxazine compound represented by the formula (1) of claim 1.

4. A method for producing the triphenodioxazine compound represented by the formula (1) of claim 1 comprising reacting a dianilide compound represented by the formula (4) with an acid chloride represented by the formula (5) to have said dianilide compound undergo ring closure and to esterify at least one hydroxyl or methoxy group of the dianilide compound with said acid chloride:

(4)

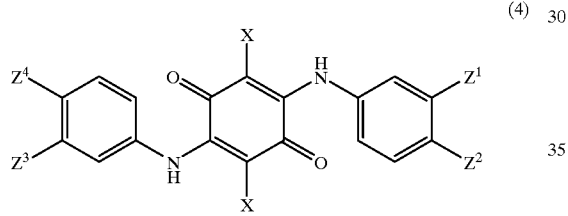

wherein each of $Z^1$ to $Z^4$ stands for a hydroxyl group, a methoxy group, a methoxy group, or a group represented by the formula (3) with at least one of $Z^1$ to $Z^4$ being a hydroxyl or a methoxy group; X stands for a hydrogen atom, a chlorine atom, a bromine atom or a fluorine atom:

(3)

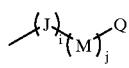

wherein i is an integer of 1 to 2, and j is an integer of 0 to 2, provided that the sum of i and j is not more than 4; each of J and M stands for a group selected from group (II) consisting of:

(II)

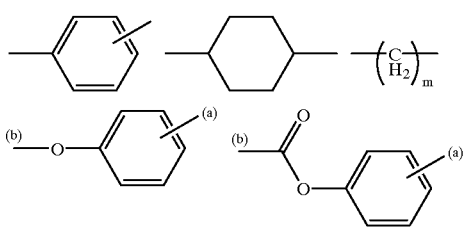

-continued

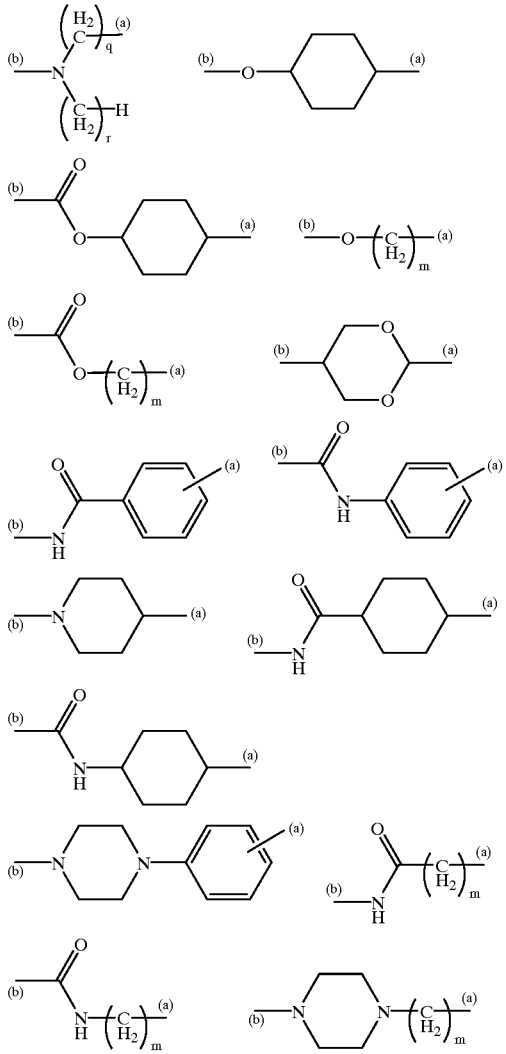

wherein m is an integer of 1 to 12, and each of q and r is an integer of 1 to 8; one or more hydrogen atoms in a phenylene group may be substituted by an alkyl group having 1 to 6 carbon atoms, an alkoxy group having 1 to 6 carbon atoms, perfluoroalkyl group having 1 to 6 carbon atoms, or a halogen atom; when J in the formula (3) is a group having ends (a) and (b) selected from group (II), end (a) binds to M, J or Q in the formula (3) and end (b) binds to J or the triphenodioxazine skeleton; when M in the formula (3) is a group having ends (a) and (b) selected from group (II), end (a) binds to M or Q and end (b) binds to M or J; Q stands for a group selected from group (III) consisting of:

(III)

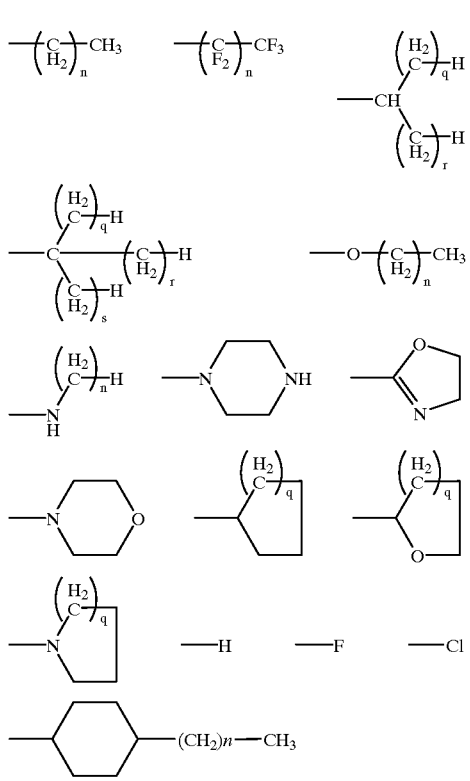

wherein n is an integer of 1 to 12, and each of q, r, and s is an integer of 1 to 8;

(5)

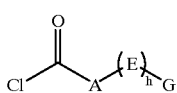

wherein h is an integer of 1 to 2; A stands for a group selected from group (I) consisting of:

(I)

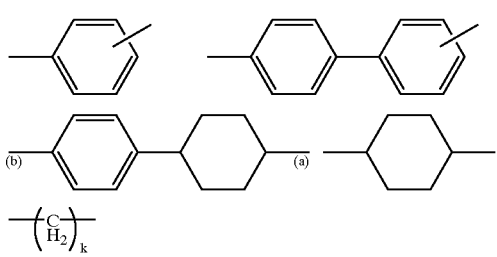

wherein k is an integer of 1 to 6; one or more hydrogen atoms in a phenylene group may be substituted by an alkyl group having 1 to 12 carbon atoms, an alkoxy group having 1 to 12 carbon atoms, a perfluoroalkyl group having 1 to 6 carbon atoms, or a halogen atom; end (a) binds to E and end (b) binds to O=CCl— in the formula (5);

E stands for a group selected from group (II) consisting of:

(II)

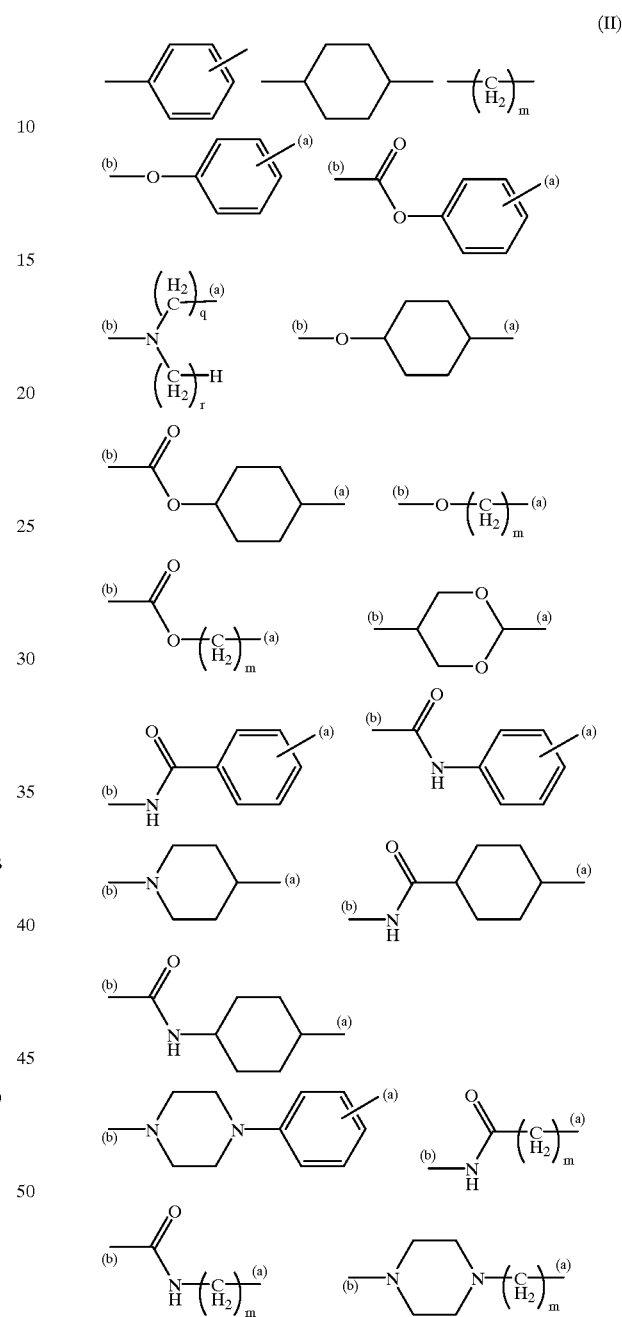

wherein m is an integer of 1 to 12, each of q and r is an integer of 1 to 8; one or more hydrogen atoms in a phenylene group may be substituted by an alkyl group having 1 to 6 carbon atoms, an alkoxy group having 1 to 6 carbon atoms, or a halogen atom; when E in the formula (5) is a group having ends (a) and (b), end (a) binds to G or E and end (b) binds to A or E;

G stands for a group selected from group (III) consisting of:

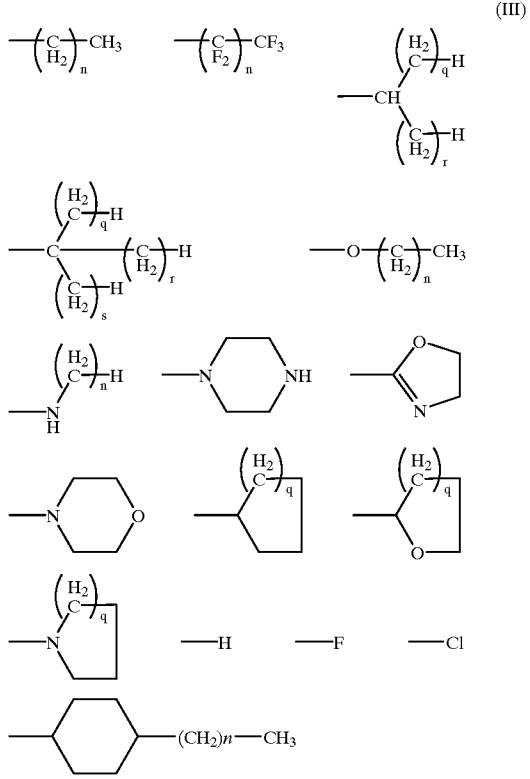

(III)

wherein n is an integer of 1 to 12, and each q, r, and s is an integer of 1 to 8.

5. The method of claim 4 wherein said dianilide compound represented by the formula (4) is a compound represented by the formula selected from the group consisting of:

6. The method of claim 4 wherein said acid chloride represented by the formula (5) is a compound selected from the group consisting of benzoyl chloride, 4-buthylbenzoyl chloride, 4-methoxybenzoyl chloride, 4-butoxybenzoyl chloride, and 3,4,5-trimethoxybenzoyl chloride.

7. A liquid crystal composition comprising at least one triphenodioxazine compound represented by the formula (1) of claim 1 and a liquid-crystalline material.

8. The liquid crystal composition of claim 7 wherein said liquid-crystalline material is selected from the group consisting of liquid-crystalline materials which take a nematic, cholesteric, smectic, or discotic phase.

9. The liquid crystal composition of claim 7 wherein said liquid-crystalline material is selected from the group consisting of compounds represented by the formulae below and mixtures thereof:

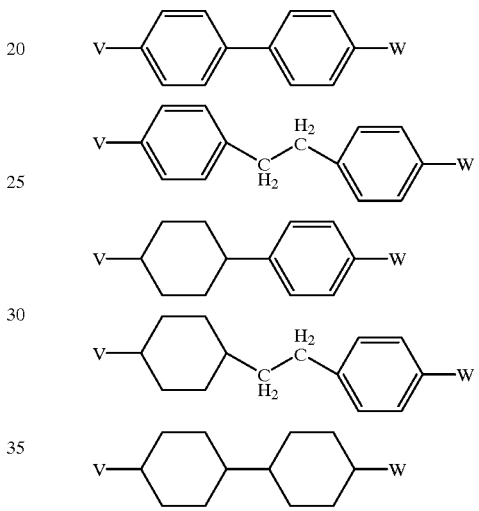

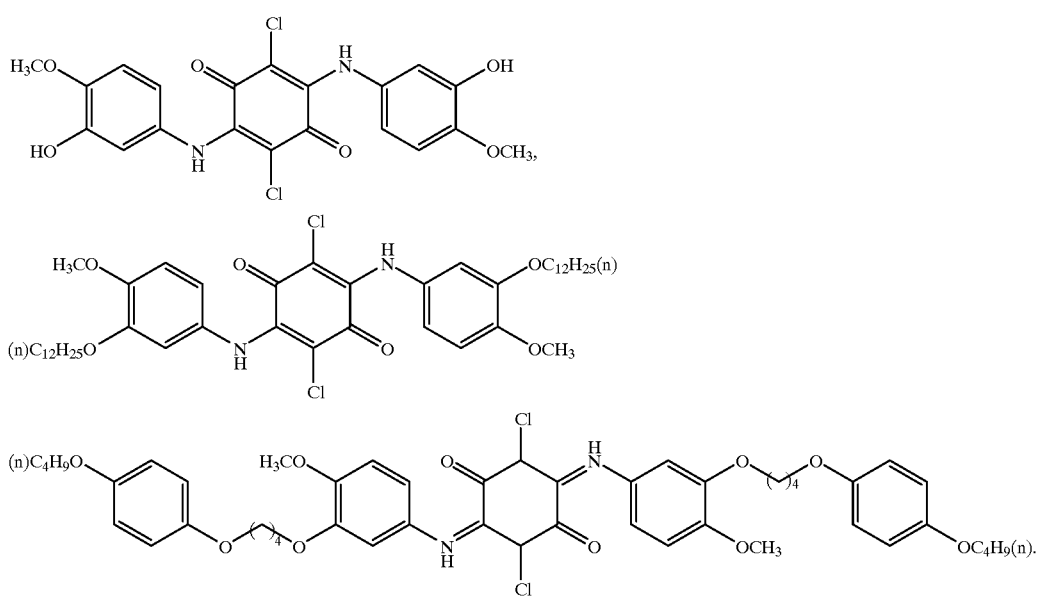

-continued

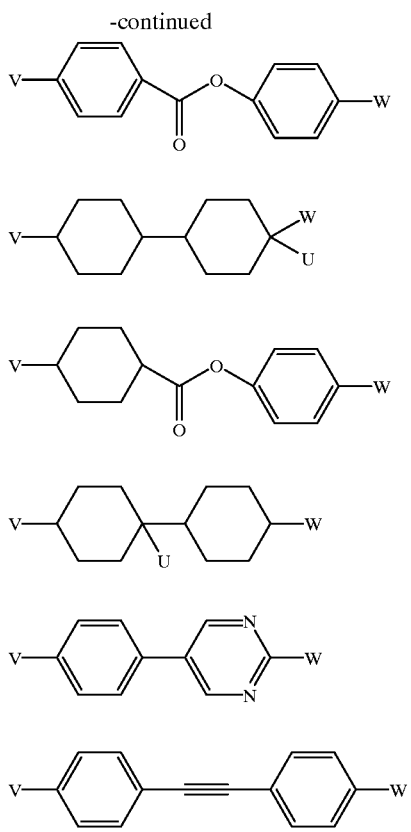

-continued

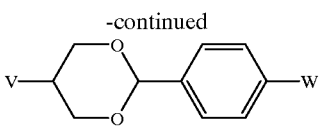

wherein one or more hydrogen atoms in a phenyl group may be substituted by a halogen atom or a cyano group; V and W each stands for a group selected from the group consisting of an alkyl group, an alkoxy group, an alkoxyalkyl group, an alkylphenyl group, an alkoxyalkylphenyl group, an alkoxyphenyl group, an alkylcyclohexyl group, an alkoxyalkylcyclohexyl group, an alkylcyclohexylphenyl group, a cyanophenyl group, a cyano group, a halogen atom, a fluoromethyl group, a fluoromethoxy group, an alkylphenylalkyl group, an alkoxyphenylalkyl group, an alkylcyclohexylalkyl group, an alkoxyalkoxyhexylalkyl group, an alkoxyphenylalkyl group, and an alkylcyclohexylphenylalkyl group; center of optical activity may be in an alkyl or alkoxy chain of said group representing each of V and W; in said group representing each of V and W, one or more hydrogen atoms in a phenyl or phenoxy group may be substituted by a halogen atom or a cyano group; U stands for a hydrogen atom, a halogen atom, or a cyano group.

10. The liquid crystal composition of claim 7 wherein content of said triphenodioxazine compound is 0.01 to 10% by weight of said liquid crystal composition.

\* \* \* \* \*